United States Patent [19]
Chejlava, Jr. et al.

[11] Patent Number: 5,630,171
[45] Date of Patent: May 13, 1997

[54] TRANSLATING FROM A PIO PROTOCOL TO DMA PROTOCOL WITH A PERIPHERAL INTERFACE CIRCUIT

[75] Inventors: Edward J. Chejlava, Jr., San Bruno; Leslie E. Cline, Sunnyvale; Kenneth C. Curt, Saratoga, all of Calif.

[73] Assignee: Cirrus Logic, Inc., Fremont, Calif.

[21] Appl. No.: 667,914

[22] Filed: Jun. 20, 1996

Related U.S. Application Data

[60] Continuation of Ser. No. 452,476, May 26, 1995, abandoned, which is a division of Ser. No. 329,554, Oct. 25, 1994, abandoned, which is a continuation-in-part of Ser. No. 964,590, Oct. 20, 1992, abandoned.

[51] Int. Cl.$^6$ .................................................. G06F 13/00
[52] U.S. Cl. .................. 395/843; 395/831; 395/834; 395/883; 395/842; 395/500
[58] Field of Search .................. 395/821–883, 395/200, 500

[56] References Cited

U.S. PATENT DOCUMENTS

| | | | |
|---|---|---|---|
| 3,673,576 | 6/1972 | Donaldson, Jr. | 364/200 |
| 4,004,283 | 1/1977 | Bennett et al. | 364/200 |
| 4,064,283 | 12/1977 | Saunders et al. | 426/583 |
| 4,145,751 | 3/1979 | Carlow et al. | 364/900 |
| 4,258,418 | 3/1981 | Heath | 364/200 |
| 4,396,995 | 8/1983 | Grau | 364/900 |
| 4,443,846 | 4/1984 | Adcock | 364/200 |
| 4,447,878 | 5/1984 | Kinnie et al. | 364/200 |
| 4,453,229 | 6/1984 | Shaire | 364/900 |
| 4,490,784 | 12/1984 | Ives et al. | 364/200 |
| 4,683,534 | 7/1987 | Tietjen et al. | 364/200 |
| 4,716,527 | 12/1987 | Graciotti | 364/200 |
| 4,779,190 | 10/1988 | O'Dell et al. | 364/200 |
| 4,800,483 | 1/1989 | Yamamoto et al. | 364/200 |
| 4,821,185 | 4/1989 | Esposito | 364/200 |
| 4,831,514 | 5/1989 | Turlakov et al. | 364/200 |
| 4,831,523 | 5/1989 | Lewis et al. | 364/200 |

(List continued on next page.)

OTHER PUBLICATIONS

Ed McNierney, "Custom-Tailored Graphics", PC Tech Journal, v5, n7, p68(6) Jul. 1987, pp. 1–6.

Tom Darbonne, "Hands-on Experience Paves the Way for Future MCA Designs", EDN, v34, n23, p233(14), pp. 1–9, Nov. 9, 1989.

David Redelfs, et al., "PC-AT Compatibility Comes to Multibus II Systems" ESD, v18, n12, p30(5), pp. 1–4, Dec. 1988.

(List continued on next page.)

*Primary Examiner*—Christopher B. Shin
*Attorney, Agent, or Firm*—Skjerven, Morrill, MacPherson, Franklin and Friel; T. Lester Wallace; J. P. Violette

[57] ABSTRACT

A high performance Local Bus Peripheral Interface (LBPI) for a computer local bus and its high performance peripheral interface(s) uses a pipelined architecture to increase the use of the available data transfer bandwidth. In one embodiment, the LBPI can be selectably configured to couple on the host side to either a VL bus or PCI bus. The LBPI maintains a countdown of the number of words of a data sector already transferred and/or "snoops" the peripheral device commands from the computer to predict the occurrence of subsequent read data transfers commands. The Controlling State Machine also "snoops" the peripheral device commands to maintain its record of the operating parameters of the peripheral devices and also keeps track of which of the devices is currently active. In one embodiment, the LBPI supports DMA and PIO data transfers on the peripheral side. In another embodiment, the LBPI translates memory data transfers into IO data transfers to improve efficiency of IO data transfers. A DMA Timeout Counter is used during DMA mode data transfer operations to prevent the system from indefinitely waiting for an appropriate DMA Request Signal from a selected peripheral. During a DMA mode data transfer operation, forced interrupts may be generated and transmitted to the host in order to emulate a PIO mode data transfer operation. During a DMA mode data transfer operation, an imposed status or "Fake 3F6" register is utilized to transmit status information to the host system.

7 Claims, 33 Drawing Sheets

U.S. PATENT DOCUMENTS

| | | | |
|---|---|---|---|
| 4,860,193 | 8/1989 | Bentley et al. | 364/200 |
| 4,860,244 | 8/1989 | Bruckert et al. | 354/900 |
| 4,870,565 | 9/1989 | Yamamoto et al. | 364/200 |
| 4,914,575 | 4/1990 | Kihara et al. | 364/200 |
| 4,935,868 | 6/1990 | Dulac | 364/200 |
| 4,935,894 | 6/1990 | Ternes et al. | 364/900 |
| 4,954,950 | 9/1990 | Freeman et al. | 395/200.01 |
| 4,958,271 | 9/1990 | Yoshida et al. | 364/200 |
| 4,972,364 | 11/1990 | Barrett et al. | 364/900 |
| 4,979,102 | 12/1990 | Tokuume | 364/200 |
| 4,991,217 | 2/1991 | Garrett et al. | 381/43 |
| 5,014,236 | 5/1991 | Pogorzelski et al. | 364/900 |
| 5,056,060 | 10/1991 | Fitch et al. | 364/900 |
| 5,073,969 | 12/1991 | Shoemaker | 395/725 |
| 5,079,636 | 1/1992 | Brody | 358/241 |
| 5,079,693 | 1/1992 | Miller | 395/250 |
| 5,081,577 | 1/1992 | Hatle | 364/200 |
| 5,091,850 | 2/1992 | Culley | 395/400 |
| 5,111,423 | 5/1992 | Kopec, Jr. et al. | 395/500 |
| 5,113,369 | 5/1992 | Kinoshita | 395/325 |
| 5,117,486 | 5/1992 | Clark et al. | 395/250 |
| 5,121,479 | 6/1992 | O'Brien | 395/250 |
| 5,136,692 | 8/1992 | Barrett et al. | 395/280 |
| 5,150,465 | 9/1992 | Bush et al. | 395/275 |
| 5,191,581 | 3/1993 | Woodbury et al. | 370/85.9 |
| 5,191,657 | 3/1993 | Ludwig et al. | 395/325 |
| 5,220,651 | 6/1993 | Larson | 395/250 |
| 5,224,213 | 6/1993 | Dieffenderfer et al. | 395/250 |
| 5,239,636 | 8/1993 | Dujari et al. | 395/425 |
| 5,239,651 | 8/1993 | Sodos | 395/725 |
| 5,241,631 | 8/1993 | Smith et al. | 395/325 |
| 5,265,211 | 11/1993 | Amini et al. | 395/325 |
| 5,280,588 | 1/1994 | D'Ambrose et al. | 395/275 |
| 5,283,883 | 2/1994 | Mishler | 395/425 |
| 5,287,460 | 2/1994 | Olsen et al. | 395/275 |
| 5,293,622 | 3/1994 | Nicholson et al. | 395/425 |
| 5,293,623 | 3/1994 | Froniewski et al. | 394/425 |
| 5,307,320 | 4/1994 | Farrer et al. | 365/230.01 |
| 5,309,568 | 5/1994 | Ghosh et al. | 395/325 |
| 5,317,715 | 5/1994 | Johnson et al. | 395/425 |
| 5,319,754 | 6/1994 | Meinecke et al. | 395/325 |
| 5,335,329 | 8/1994 | Cox et al. | 395/325 |
| 5,363,485 | 11/1994 | Nguyen et al. | 395/325 |
| 5,367,646 | 11/1994 | Pardillos et al. | 395/325 |
| 5,377,184 | 12/1994 | Beal et al. | 370/24 |
| 5,379,381 | 1/1995 | Lamb | 395/826 |
| 5,379,382 | 1/1995 | Work et al. | 395/275 |
| 5,379,384 | 1/1995 | Solomon | 395/325 |
| 5,388,224 | 2/1995 | Maskas | 395/325 |
| 5,404,454 | 4/1995 | Parks | 395/275 |
| 5,404,462 | 4/1995 | Datwyler | 395/325 |
| 5,412,782 | 5/1995 | Hausman et al. | 395/250 |
| 5,420,987 | 5/1995 | Reid et al. | 395/325 |
| 5,440,698 | 8/1995 | Sindhu et al. | 395/200.08 |
| 5,440,754 | 8/1995 | Goeppel et al. | 395/800 |
| 5,444,852 | 8/1995 | Nakabayashi | 395/823 |
| 5,450,551 | 9/1995 | Amini et al. | 395/299 |
| 5,475,860 | 12/1995 | Ellison | 395/846 |
| 5,551,009 | 8/1996 | Amini et al. | 395/492 |

OTHER PUBLICATIONS

Fabien Viallet, "Control Two Steppers with One Microprocessor", Electric Design, v36, n24, p101(4), pp. 1–3, Oct. 27, 1988.

Ed McNierney, "High–Performance Graphics", PC Tech Journal, v5, n7, p56(8) Jul., 1987, pp. 1–8.

Augie Hansen, "Mapping PC Address Space", PC Tech Journal, v5, n3, p102(9) Mar. 1987, pp. 1–6.

Gerald Conn, "Biodirectional Serial Computer Interface", Electronics Australia, Apr. 1981, pp. 82–83, 85–88, 90, 93 and 134.

Appian's News Release dated Nov. 8, 1991 on P928, "Appian Announces P928 FAST Local Bus Peripheral Interface Device."

Appian's VGA and IDE Benchmarks on P928 dated Nov., 1991.

Appian's BIOS Application Note by R. Kalish dated Dec. 17, 1991 on P928.

Appian's BIOS Application Note by Richard Kalish dated Jan. 2, 1992 on P928.

Appian's Fast Peripheral Interface Data Sheet dated Jan., 1992 on P928.

Appian's Fast Peripheral Interface Design Design Manual dated Apr., 1992 on P928.

Appian's Local Bus IDE Disk Interface Advanced Information Datasheet dated Jun., 1992 on AD12.

Appian's Fast Peripheral Interface Product Brief dated Jul., 1992 on P928.

Appian's Fast Peripheral Interface Design Manual Addendum dated Jul., 1992 on P928.

Appian's Fast Peripheral Interface Design Manual dated Aug., 1992 (Revision 2) on P928.

Appian's Local–bus IDE Interface Preliminary Information Packet dated Sep., 1992m on AD12.

Appian's News Release dated Sep. 14, 1992 on the AD12 Local Bus IDE Disk Interface Chip.

Appian's Applications Update #1 dated Oct. 6, 1992 on AD12.

Appian's Local Bus Peripheral Interface Product Brief dated Nov., 1992 on P928.

Appian's Engineering Sample Notice dated Nov. 23, 1992 on AD12.

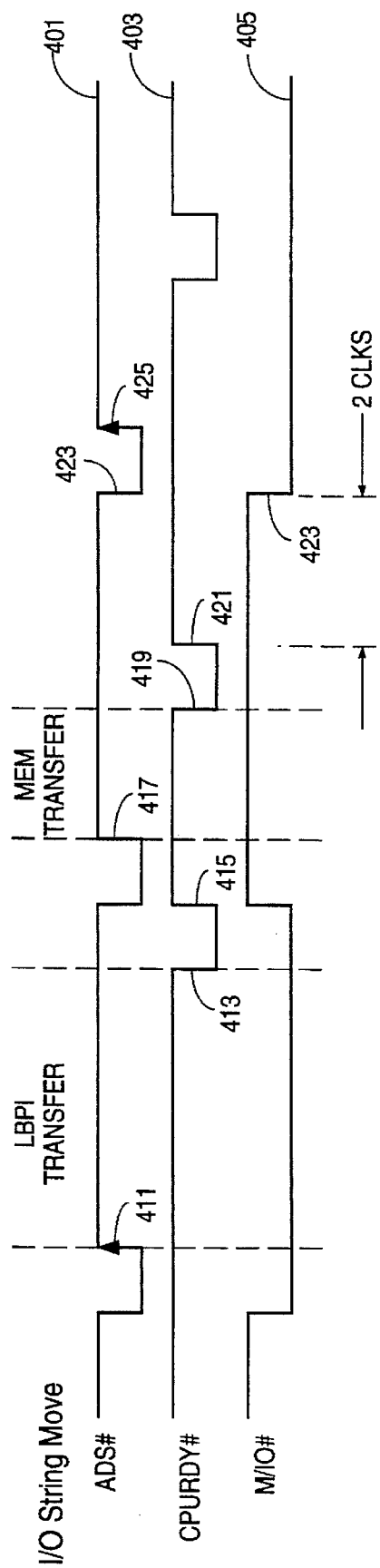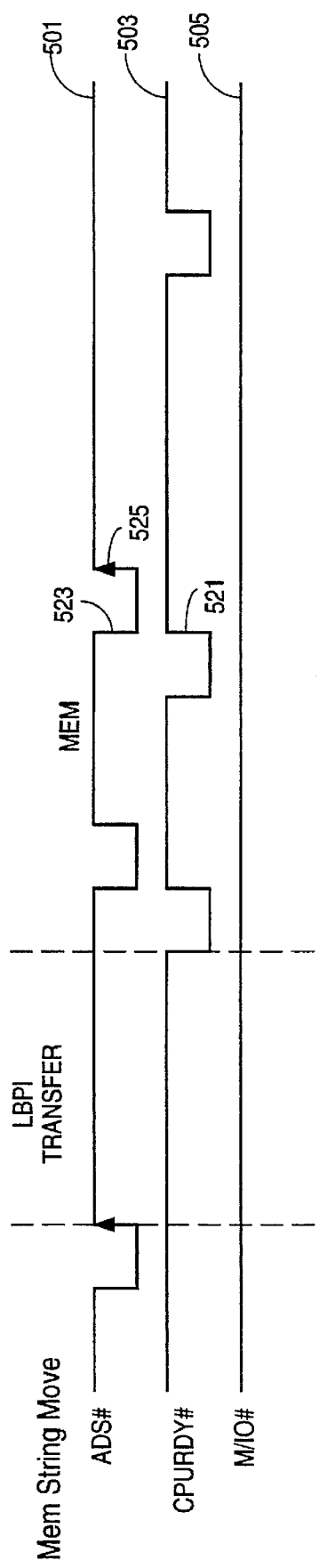

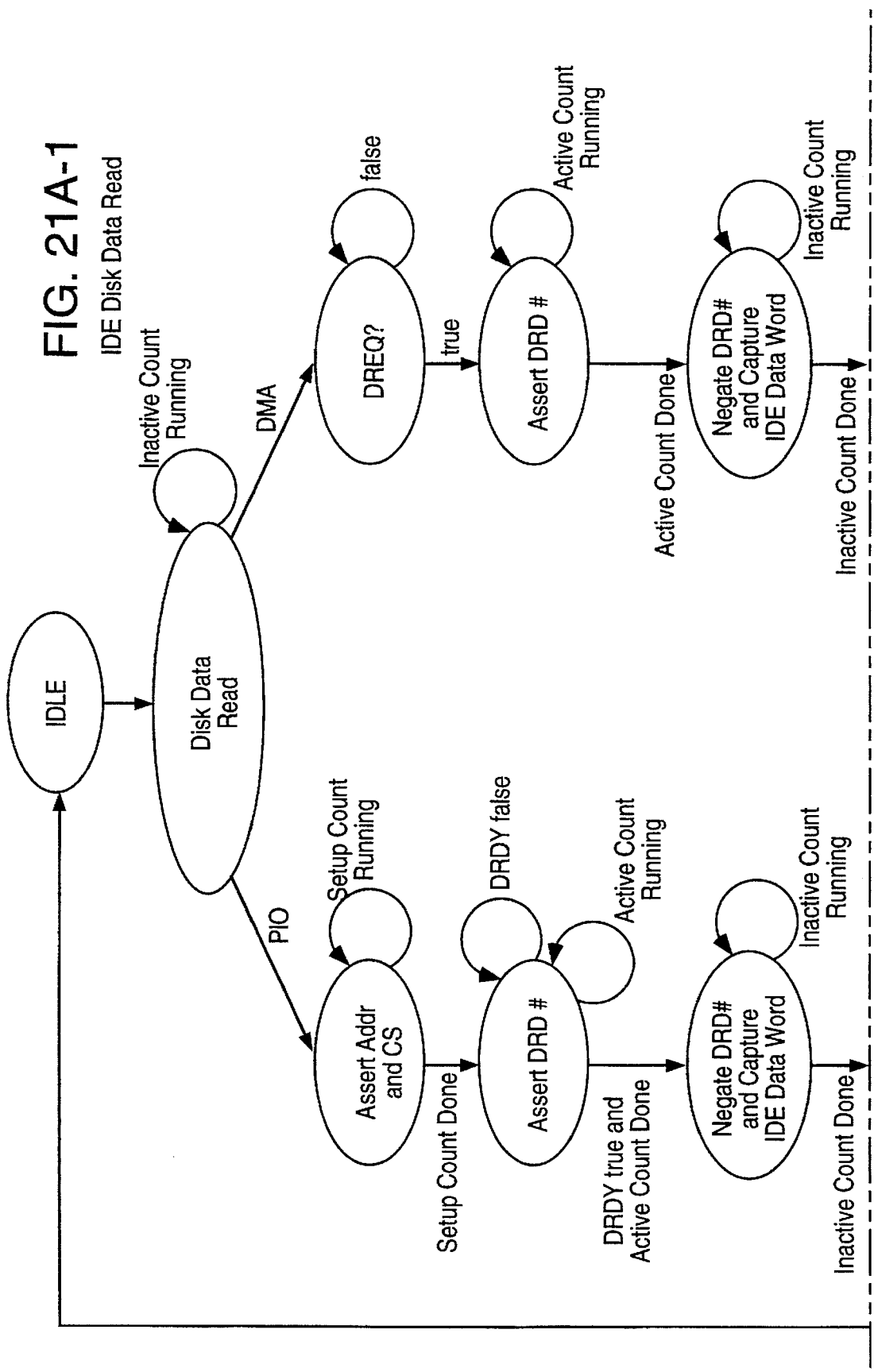

IDE Disk Data Write

TRANSLATING FROM A PIO PROTOCOL TO DMA PROTOCOL WITH A PERIPHERAL INTERFACE CIRCUIT

CROSS-REFERENCE TO RELATED APPLICATIONS

This application is a continuation of application Ser. No. 08/452,476, filed May 26, 1995, abandoned, which in turn is a divisional of application Ser. No. 08/329,554, filed Oct. 25, 1994, abandoned, which in turn is a continuation-in-part of application Ser. No. 07/964,590, filed Oct. 20, 1992, abandoned.

FIELD OF THE INVENTION

This invention relates to computer peripheral interfaces. More particularly, this invention relates to a high performance interface between a computer and at least one high data speed peripheral device such as a Winchester hard disk drive or a high resolution color graphics display.

BACKGROUND OF THE INVENTION

The introduction of the general purpose microprocessor on a single integrated circuit (IC) into the marketplace resulted in the birth and development of inexpensive computers. These microprocessors included Zilog's Z80, and Intel's 8088. During the early development phase, different designs emerged with incompatible system architectures and operating systems. Apple Computer entered the market with the Apple One, and was followed by a number of other manufacturers such as Vector Graphics and Seattle Computer who introduced their own unique computers, using operating systems CP/M and DOS (the parent operating system of MS/DOS) respectively.

When International Business Machines (IBM) introduced the IBM Personal Computer (PC), based on Intel's 8088 and made its peripheral interface bus (IBM PC Bus) and Read Only Memory (ROM) Basic Input Output System (BIOS) public, it rapidly became the defacto industry standard. Many peripheral manufacturers began producing computer graphics and disk drive interface printed circuit boards (PCB) compatible with the IBM PC Bus. The next step of this evolution produced the IBM PC AT based on the 16-bit Intel 80286, which resulted in the expansion of the 8-bit based IBM PC Bus into a 16-bit peripheral interface bus for the IBM PC AT called the IBM AT ISA Bus. This path eventually lead to the 32-bit world of the 80386 and the 80486, with the ISA Bus remaining the defacto standard interface for peripheral devices. Meanwhile, peripheral device performance and microprocessor speeds continued their rapid increase and as a result, the ISA Bus is now a bottleneck and a serious impediment to improved performance of the PC as a whole.

The early Winchester hard disk drives developed for PCs had data burst rates of about 0.5 Mbits/sec and mean seek time of 100 msecs, which the ISA bus was able to service fairly efficiently. However, after over a decade of rapid development, hard disk drives are now capable of data burst rates of over 10 MBytes/sec and mean seek times of under 12 msecs. Increasingly, "intelligent" circuitry was added to the hard drives and another defacto peripheral interface standard soon gained wide acceptance. This standard is known as the Integrated Device Electronics interface bus (IDE Bus) and is the interface between a hard disk drive and a simplified conventional hard disk controller card. The disk controller card is in turn coupled to the computer via the ISA Bus. Eventually, the IDE Bus became the ANSIS-ATA standard proposal currently evolving but adopted by most manufacturers. The IDE interface is a 40-pin flat cable format and is capable of supporting data burst rates possibly exceeding 20 MByte/sec. In contrast, the conventional ISA interface can theoretically support burst rates of 5 MByte/sec on the programmed I/O cycles generally used for disk drive operations but in practice a typical ISA IDE disk drive only achieves an average data transfer rate of less than 1 MByte/sec typically.

FIG. 1 shows a block diagram of the conventional IDE hard disk interface between the Central Processing Unit (CPU) 1 of the computer and a pair of hard drives 10 & 11.

The hard drives 10 and 11 ("disk drive" is used herein interchangeably with "hard drive") illustrated in FIG. 1 are ATA (Advanced Technology Attached) hard disk drives. The ATA standard interface having 40 total lines, includes a three-bit address bus designated as DA0, DA1, and DA2 used for indexing drive registers; a 16 bit bidirectional data bus designated as DD0 through DD15; a data width format signal designated as IOCS16- indicating either an 8 or 16 data bit capability, a write strobe signal designated as DIOW-; a read strobe signal designated as DIOR-; an interrupt request signal INTRQ, a status signal I/O Channel Ready designated as IORDY, and host chip select 0 and 1 signal lines respectively designed as CS1FX- and CS3FX-. The two host chip select signal lines CS1FX- and CS3FX- which act similar to an address line, select access of either Command Block registers or Control Block registers within an attached ATA disk drive. Other signals present within the ATA standard interface that may be significant to the description of the present invention will be described below. The complete ATA standard interface and communication standard is described within the APPENDIX 1 "Information Technology—AT Attachment Interface for Disk Drives", which is a part of this application and is incorporated herein by reference in its entirety.

The disk drives 10 and 11 may be designated disk drive 0 and disk drive 1 by the ATA cable connection for the ATA standard interface signal CSEL (ground=drive 0, open=drive 1) or by setup switches or jumper wires within the disk drive electronics that are read upon reset. Only one of the disk drives 10 or 11 connected to the same ATA cable 110 can be accessed at any one time. The selection of whether disk drive 0 or disk drive 1 is to be accessed is controlled through use of the drive/head register which is embedded in each disk drive. Both disk drives 10 and 11 simultaneously respond to writes on the cable to the drive/head register, however only the selected drive will respond to writes to other registers therein. Bit 4 of each drive/head register, designated DRV, is used to select the drive that should be active to receive the other drive register accesses and is compared by the drive with its CSEL or switch/jumper configuration as drive 0 or drive 1. If the host CPU 1 sets DRV to zero, then drive 0 is selected and further register accesses are to drive 0 registers. If the host CPU 1 sets DRV to one, then drive 1 is selected and further register accesses are to drive 1 registers.

Accesses to the disk drives occur during cycles such as those illustrated in FIG. 1A as either ATA read cycles 190 or ATA write cycles 191. Note that during all ATA read or write cycles either a DACK-, CS1FX-, or CS3FX- signal becomes active as illustrated by the CS1FX-/CS3FX- waveform 181. Activation of DACK-, CS1FX-, or CS3FX- is then followed by either DIOR- active low signal or DIOW-active low signal as represented by the DIOR- waveform 182 or the DIOW- waveform 183. If neither DACK-, CS1FX-, nor CS3FX- is active, then no write or read operation is being performed to the disk drives regardless of the condition of other signals on the ATA cable 110 including DIOR- and DIOW- as illustrated by the ATA NOOP cycles 192 and 193.

If a read or write host CPU transfer cycle to or from the ATA drive needs to be extended, then the ATA drive deasserts the IORDY signal inactive low. This indicates that the selected hard disk drive needs further time to complete the present operation before any other operation may take place. Otherwise IORDY is pulled up to an active one or an active high level by a pullup resistor.

Various I.C. manufacturers such as Chips & Technologies and Opti Incorporated produce versions of a PC chip set 2 to convert non-standard CPU signals into ISA Bus signals. Additionally, an ISA Interface 5 provides a second level of minor protocol conversion between the ISA Bus and the IDE Bus interface to the hard disks 10 & 11. The ISA Interface 5 includes a register such as an LS244 which provides system compatibility with a floppy drive (not shown).

However, because of the data transfer speed limitations imposed by the ISA Bus standard, of 8 MHz, there is very little incentive to produce hard drives with higher data transfer rates. As a result, most of recent improvements to the hard drive technology have been concentrated in the area of physical size reduction and increased data capacity. Therefore the introduction of a new high performance peripheral interface standard will enable the faster CPU of the computer or microprocessor in the computer to take advantage of faster hard drives already available today and further create an incentive for hard drive manufacturers to increase data transfer rates.

Meanwhile, in the field of computer graphics, a very similar evolution was taking place. Early PC monochrome graphics cards based on the monochrome display adapter (MDA) had no graphics capabilities and could only display text. This was followed by the Color Graphics Adapter (CGA) with 4 color graphics capability. In contrast, today's Enhanced Graphics Adapter (EGA), Video Graphics Array (VGA) and the Super VGA (SVGA) are capable of both text and higher resolution graphics. As a result, a new class of multifrequency displays were introduced, starting at EGA resolution (640*350) and going up to 640*400, 640*480, 800*600, 1024*768, or even higher. In addition to the higher resolution, multifrequency displays also offer more colors. When operated in a digital mode, they have 64 color capability.

FIG. 2 shows a block diagram of a conventional interface between the CPU 1 and the graphics display device 20. The PC chip set 2 provides an interface between the CPU bus and the ISA bus. Additionally, a VGA Interface Controller 6 provides a second level of protocol conversion between the ISA Bus and the VGA Bus interface to the graphics display device 20.

The two techniques commonly used for storing color information are the packed pixel method and the color plane method as illustrated in FIGS. 3A and 3B respectively. A pixel is a dot having an X-Y position defined on the graphics display. Both VGA and SVGA define color plane oriented devices and also support emulation modes that use packed pixels. With packed pixels, all the color information for a pixel is packed into one word of memory data. With the color plane approach, the display memory is separated into several independent planes of memory, with each plane dedicated to controlling one color component (such as the primary colors red, green or blue). Each pixel occupies one bit position in each color plane. The color plane method makes more efficient use of the display memory.

Nevertheless, in both the packed pixel and the color plane methods, a large amount of display memory space is needed to support color graphics applications, and there exists a potential for a high volume of pixel data read/write requests by the CPU to the display memory.

This is because the VGA and many SVGA implementations, like its predecessors, are non-intelligent display device standards; i.e. they have no on-board drawing or processing capability. The CPU is responsible for computing any changes required in the display and drawing directly into display memory in real-time. Hence there is potentially a very high volume of data that must be read from or written by the CPU to and from the display memory, all of which must pass through the peripheral interface between the CPU and the display memory. Therefore it is increasingly clear that the ISA bus is inadequate for today's real-time computer graphics applications requiring high speed and high volume transfer of data, such as three dimensional simulation of a number of mechanical moving parts in real-time or the animation used in the movie industry.

Hence there is an urgent need for a new high performance peripheral interface capable of keeping up with the demands of today's 32-bit microprocessors running at typical speeds of 50 MHz and accessing high performance peripherals such as high speed hard drives and high resolution graphics displays.

A consortium of video equipment manufacturers has collectively agreed to support a new standard for the CPU local bus which is substantially faster than the IBM AT ISA Bus. This new standard has been named the Video Electronic Standard Association (VESA) VL-Bus. Another CPU local bus standard currently gaining acceptance is the Peripheral Component Interface Local (PCI) bus standard. Both the VL bus and the PCI bus do not directly support DMA data transfers with disk drives or other peripheral devices attached to the IDE bus. However, some current disk drives transfer data through DMA transfers faster than through PIO transfers. Thus, one shortcoming of the VL and PCI buses is that they cannot exploit the faster data transfer bandwidth that some disk drives have in the DMA mode.

In some applications, the host side PIO data bandwidth is slower than the IDE side data bandwidth. This condition may arise because the newer disk drives are more efficient than the CPU in transferring data, or because the CPU is operated at a slower speed to conserve energy. Accordingly, in these applications, it is desirable to transfer data from the peripheral bus to a peripheral interface device that interfaces a host bus with peripheral devices at a clock rate faster than the CPU energy saving clock rate so that the data is available in the peripheral interface device when the CPU clock rate is returned to normal.

SUMMARY OF THE INVENTION

In accordance with the invention, prior art difficulties resulting in the inability to efficiently exploit the data transfer bandwidth capability of high performance peripheral devices and high speed computer local buses, due to inefficient handshaking protocols and serial read/write transfer operations, are overcome by pipelining data transfers using Read-Ahead and Posted-Write modes of operation.

Efficiency of Read-Ahead operations is further enhanced by maintaining a countdown of the number of words of a 512-byte data sector already transferred in an IBM PC or compatible, and automatically fetching the next "chunk" of data from the peripheral device. In addition, the Local Bus Peripheral Interface (LBPI) also "snoops" the peripheral device commands from the computer to intelligently predict address locations of subsequent read data transfers.

To accomplish all of the above, the LBPI which is coupled between the computer local bus and the peripheral interface (s), is provided a pipelined architecture which includes a Read Ahead Buffer, a Read Ahead Counter, a Data Out Latch, and a Controlling State Machine with a Configuration Register.

The Controlling State Machine also "snoops" the peripheral device commands to maintain its record of the operating parameters of the peripheral devices and also keeps track of which of the devices is currently active.

In accordance with another embodiment of the present invention, the LBPI provides a PIO-protocol to DMA-protocol translation to allow the disk drives to receive (or transmit) data to the LBPI using DMA protocol even though the computer sends PIO write (or read) commands to the LBPI. Further, the LBPI can selectably interface to either a VL bus or PCI bus on the computer local bus side. Thus, this embodiment allows the computer system in which the embodiment is embedded to exploit the relatively faster DMA data transfer bandwidth of some disk drives.

In accordance with yet another embodiment, on the host side, the LBPI supports memory-mapped IO data transfers in addition to PIO data transfers. The LBPI will respond to memory transfers to (or from) predetermined addresses in the memory space and translate the memory data transfer to either a PIO or DMA data transfer on the ATA side of the LBPI. Because the host typically handles memory data transfers faster than PIO data transfers, this embodiment allows the system to have an increased IO bandwidth when the host is the bandwidth bottleneck (e.g., systems with high performance disk drives, or systems where the host is slowed to conserve power).

In accordance with another embodiment of the present invention, a clock switch is included in the LBPI to provide disk clock signals (DCLK) to the controlling state machine instead of CPU clock signals when the CPU clock is running at a slower rate to conserve energy. The disk clock signals (DCLK), which have a higher rate than the CPU clock in the power saving mode, permit faster transfer of data from the peripheral device(s) to the LBPI, thereby reducing the overall time required to transfer data from a peripheral device to the CPU after the CPU returns to its normal operational rate.

A DMA Timeout Counter is used during DMA mode data transfer operations to prevent the system from indefinitely waiting for an appropriate DMA Request Signal from a selected peripheral. The DMA timeout counter is cleared and started when a DMA mode data transfer operation is initialized. The DMA timeout counter is stopped when the selected peripheral asserts the DMA Request Signal. During the DMA mode data transfer operation, the timeout counter is started again each time the DMA Request signal is deasserted and stopped and cleared each time the DMA Request signal is asserted. If the timeout counter reaches a predetermined value an interrupt signal is generated and transmitted to the host and to an imposed status register, the data transfer operation is terminated and during a write operation the appropriate data is placed back on the system bus.

During a DMA mode data transfer operation, forced interrupts maybe generated and transmitted to the host in order to emulate a PIO mode data transfer operation. The interrupt signals from the peripherals are passed through to the host. The necessary interrupt signals are transmitted to the host to provide a PIO mode interface with the host to complete the data transfer operation.

During a DMA mode data transfer operation, an imposed status or "Fake 3F6" register is utilized to transmit status information to the host system. When a read operation is requested by the host system of the selected peripheral's status register, the present invention intercepts the command and substitutes the information from the imposed status or "Fake 3F6" register for the information from the selected peripheral's status register.

BRIEF DESCRIPTION OF THE DRAWINGS

FIG. 17 illustrates a waveform timing diagram showing signal transitions and operating cycles of a VL bus PIO data transfer.

FIG. 18 illustrates a waveform timing diagram showing signal transitions and operating cycles of a VL bus memory data transfer.

DETAILED DESCRIPTION OF THE INVENTION

Figure 1:
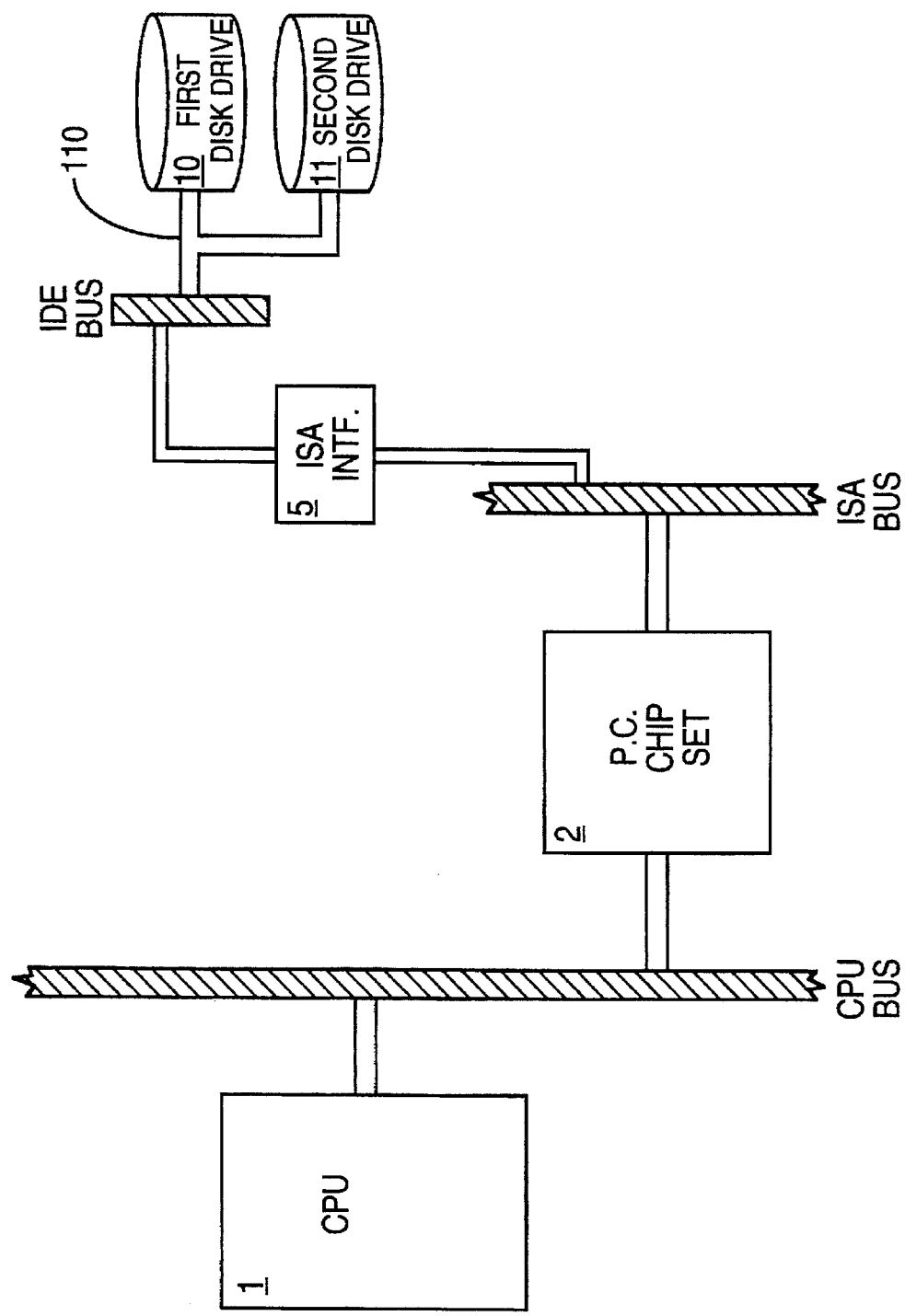
FIG. 1 shows a block diagram of the conventional AT ISA interface between a CPU and a pair of hard drives (PRIOR ART).
Figure 1A:
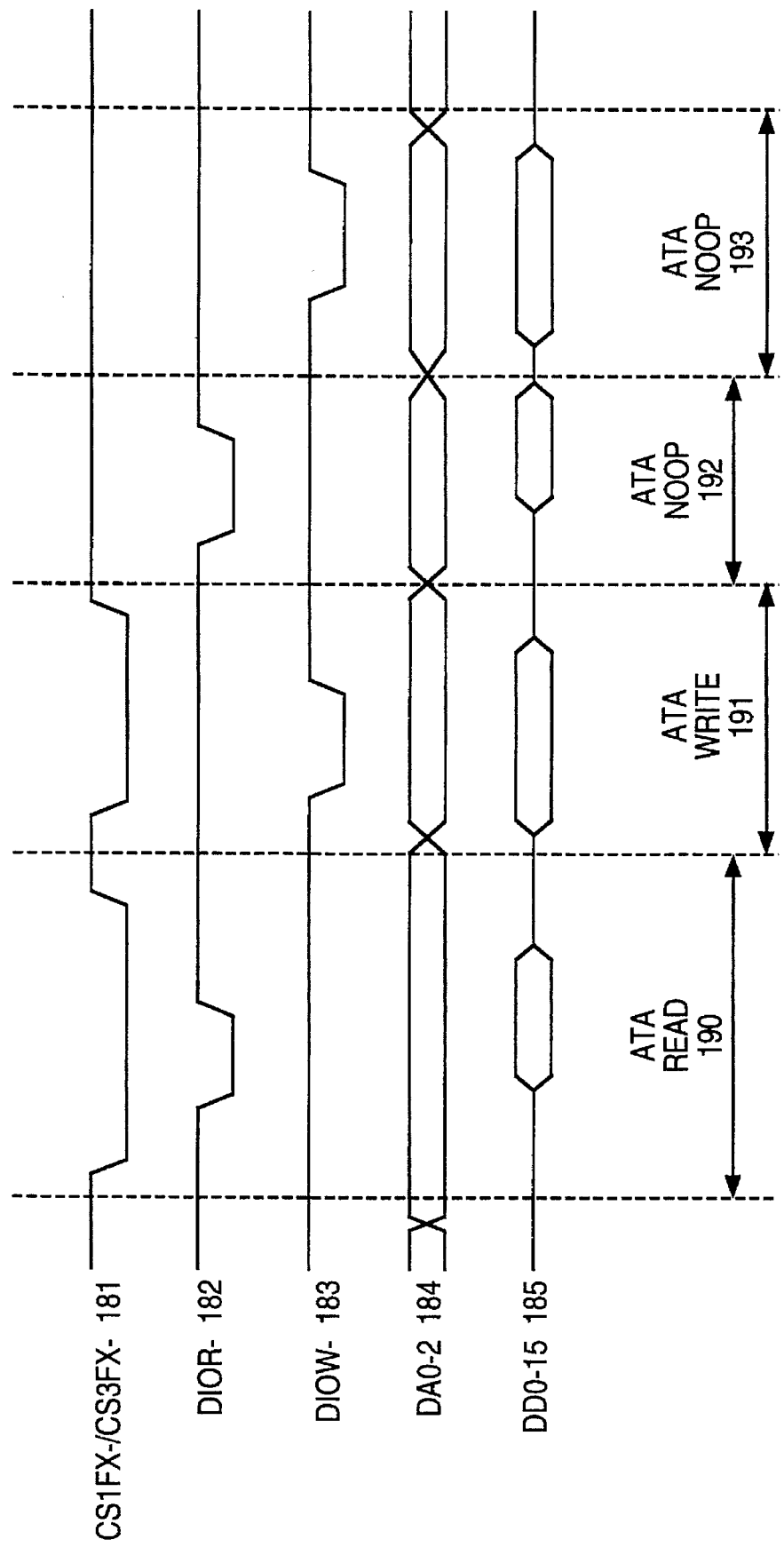
FIG. 1A illustrates a waveform timing diagram showing signal transitions and operating cycles of the ATA bus (PRIOR ART).
Figure 2:
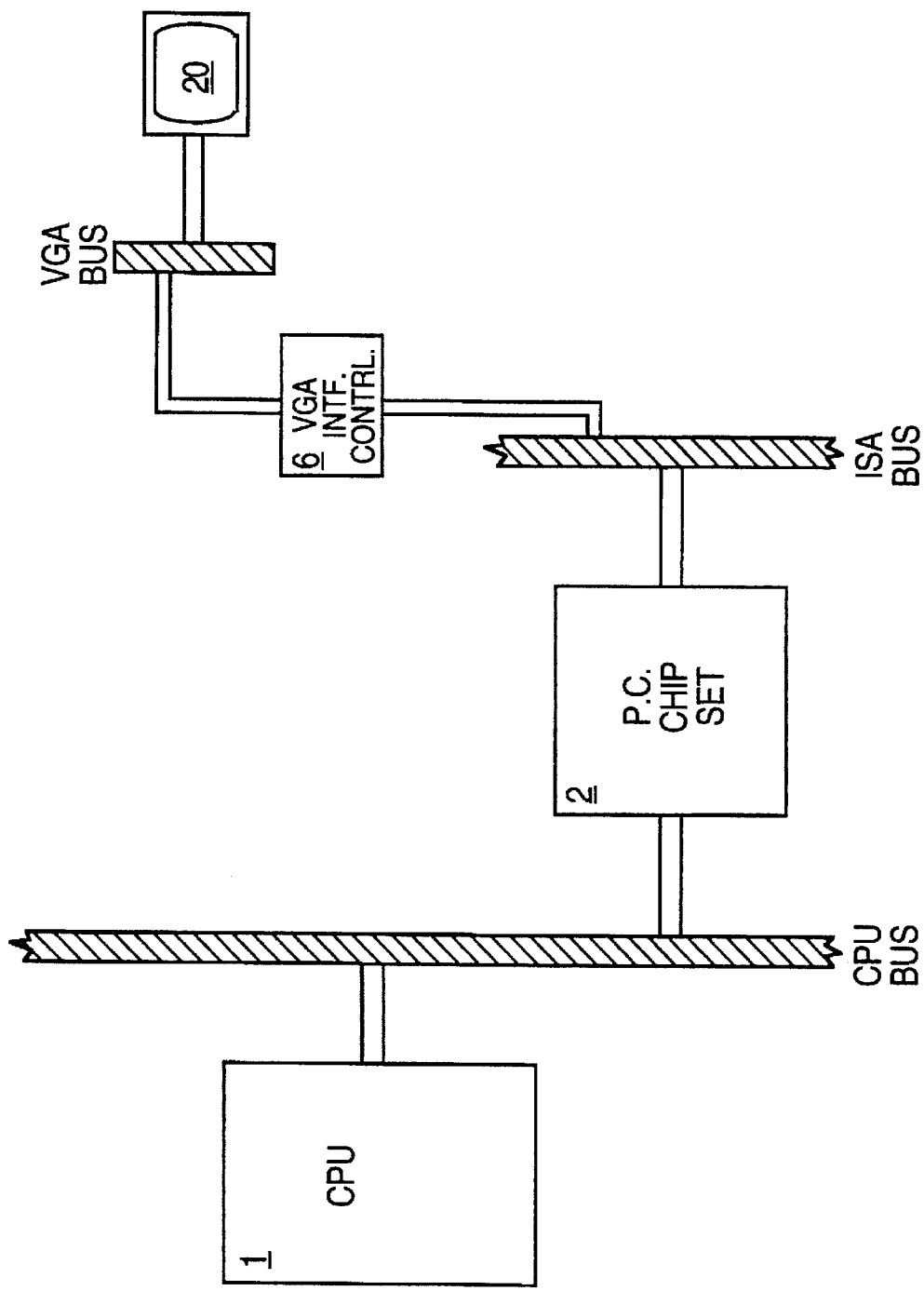
FIG. 2 shows a block diagram of the conventional AT ISA interface between a CPU and a graphics device (PRIOR ART).
Figure 3A:
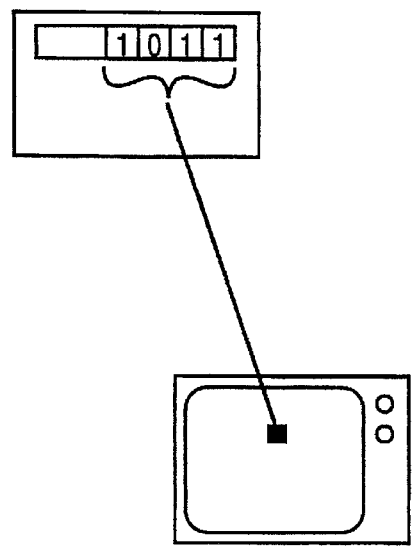
FIG. 3A illustrates the packed pixel method of storing color information in memory (PRIOR ART).
Figure 3B:
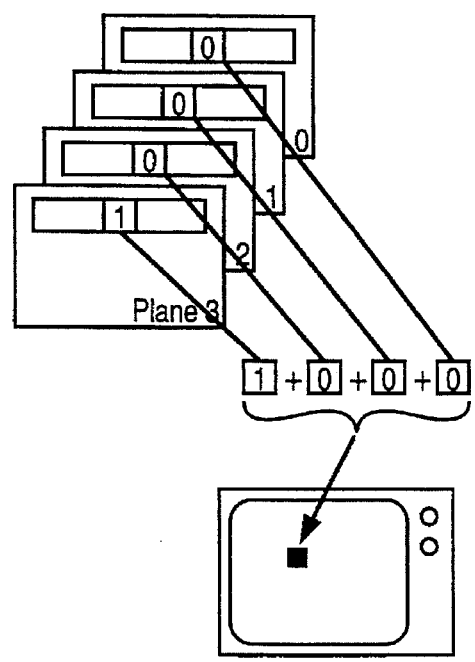
FIG. 3B illustrates the color plane method of storing color information in memory (PRIOR ART).
Figure 4:
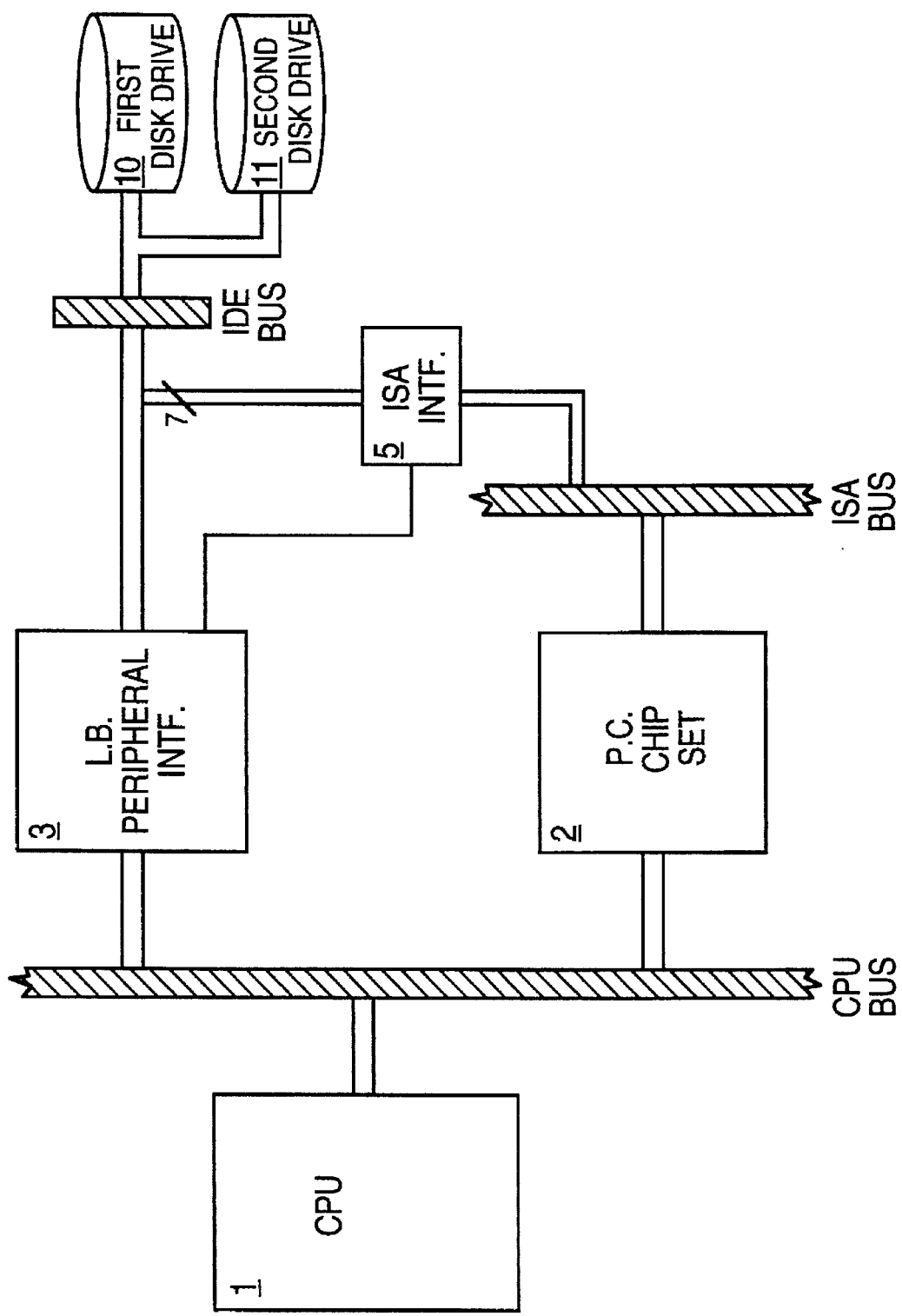
FIG. 4 shows a block diagram of a first embodiment of a Local Bus Peripheral Interface (LBPI) between a CPU and a pair of hard drives.

FIG. 4 shows a block diagram of a first embodiment of the Local Bus Peripheral Interface (LBPI) 3 between a CPU 1 and a pair of hard drives 10 & 11 in accordance with the invention. The LBPI 3 provides protocol conversion between the CPU local bus and the IDE bus interface to the hard disks 10 & 11. An ISA Interface 5 provides system compatibility at I/O address 3F7 for a conventional PC with a floppy drive on the ISA bus.

Figure 7:
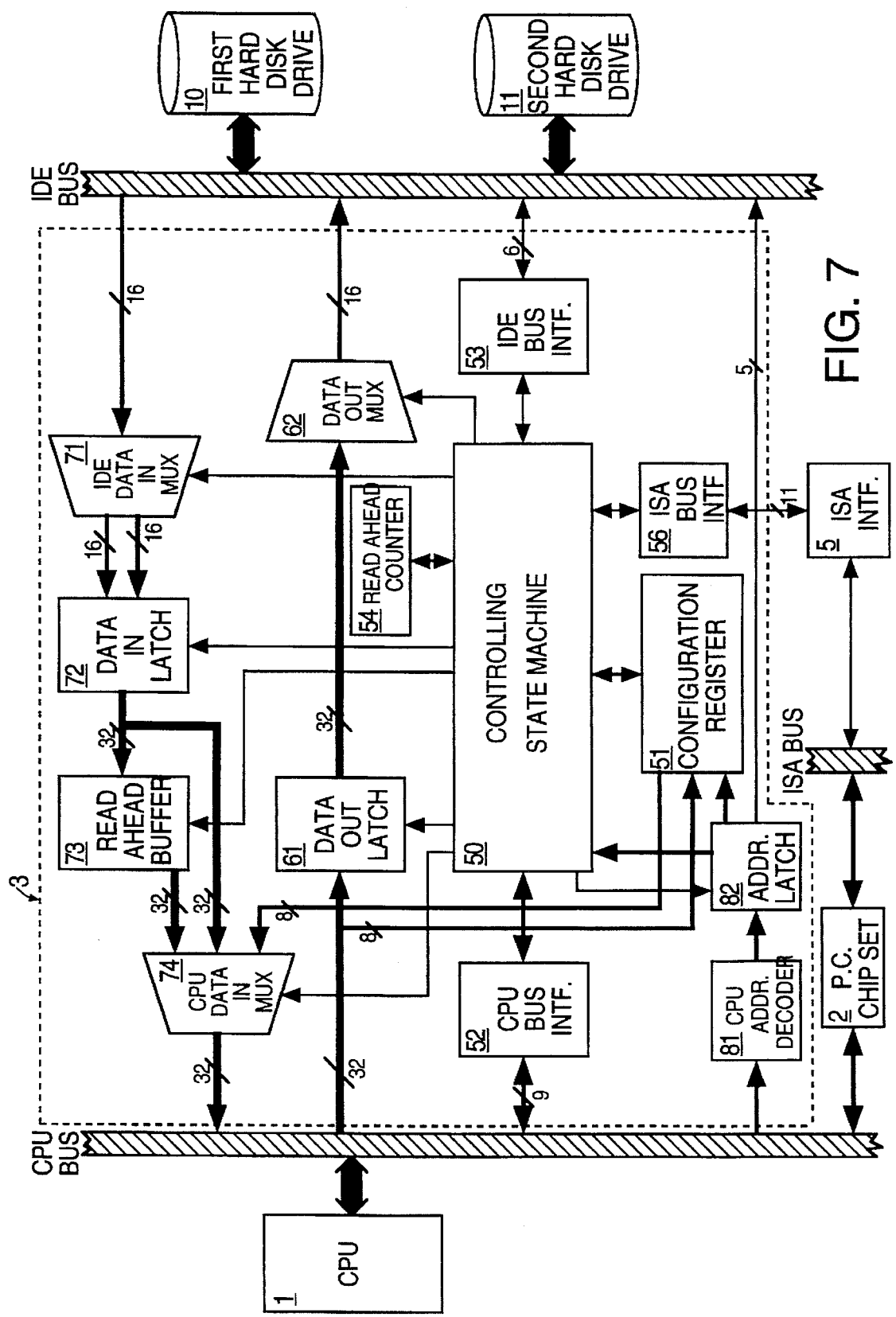
FIG. 7 shows a detailed block diagram of the first embodiment of the LBPI circuitry between a CPU and a pair of hard drives.

FIG. 7 shows a more detailed block diagram of the first embodiment of the LBPI 3 circuitry between a CPU 1 and a pair of hard drives 10 & 11, and illustrates those functional blocks relevant to analyzing system level concurrency from programmed I/O data transfers as it relates to the LBPI 3. Note that the LBPI 3 has full control of its IDE (ATA) bus and can perform transfers over that IDE bus independently of other computer system operations.

Figure 12:
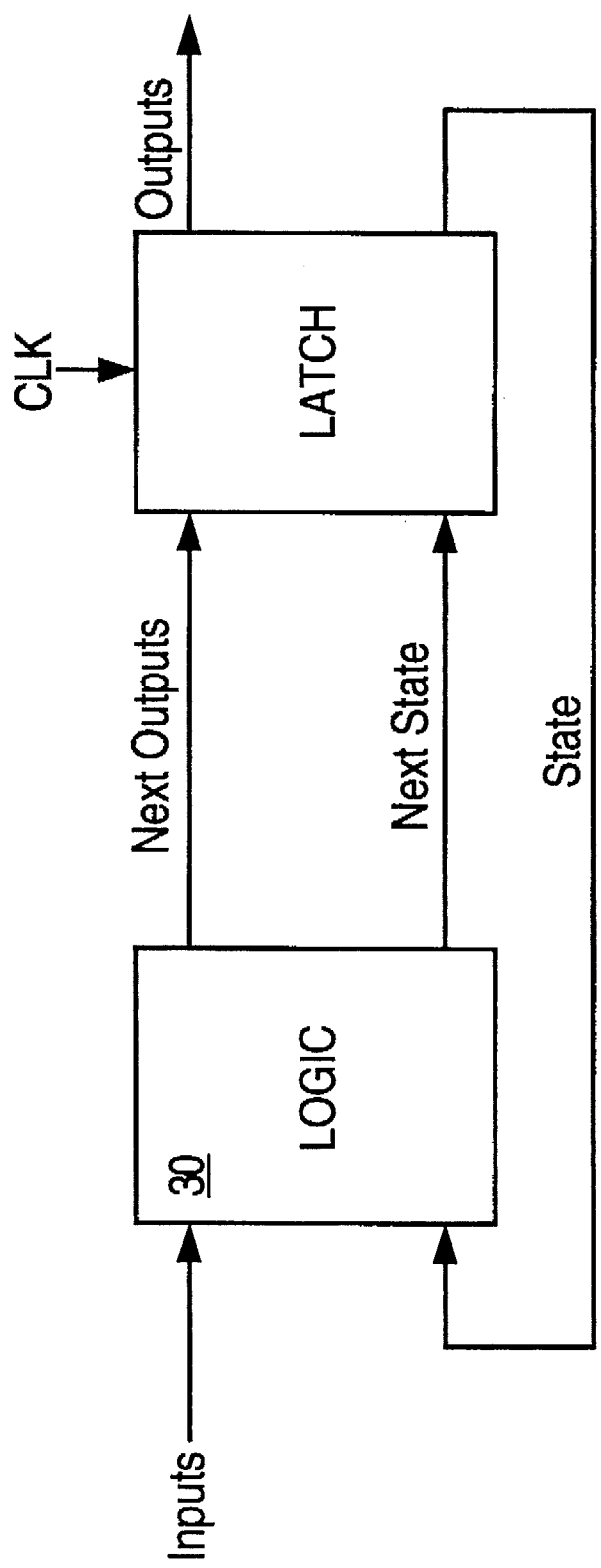
FIG. 12 shows a block diagram of one of the state machines within the Controlling State Machine of the first embodiment.
Figure 13:
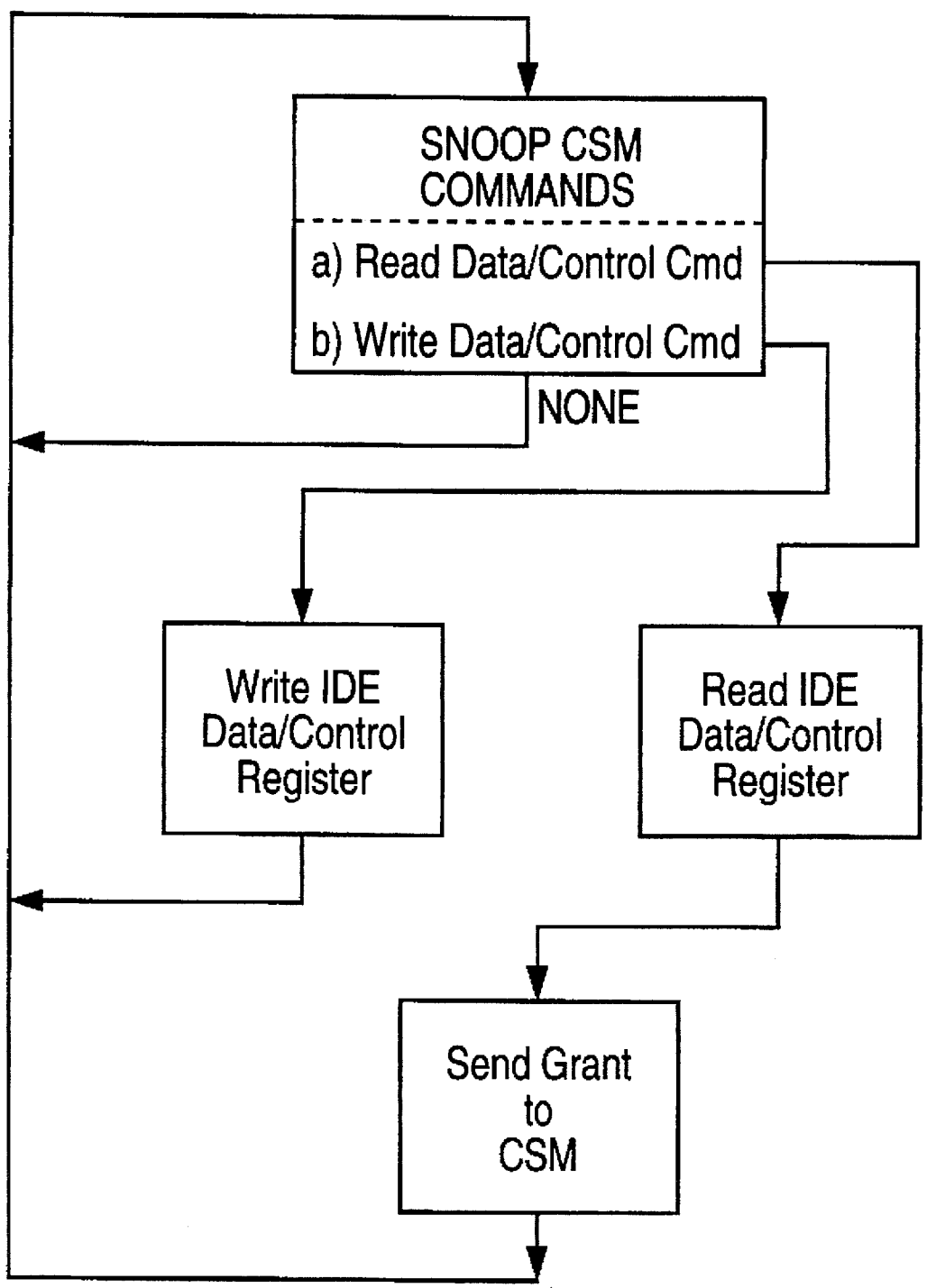
FIG. 13 shows a flow diagram of the IDE-side State Machine (ISM) portion of the Controlling State Machine of the first embodiment.

FIG. 12 shows one of the state machines within the Controlling State Machine of the first embodiment. Hard wired Logic 30 provides the control sequences for the LBPI configuration commands, disk drive control commands, disk read and write commands. FIG. 13 shows a flow diagram of the ISM and FIGS. 14a, 14b, 14c and 14d show the flow diagrams of the CSM of the first embodiment.

Referring again to FIG. 7, the Controlling State Machine 50 is coupled to the CPU local bus and the IDE Bus via a CPU Bus Interface 52 and an IDE Bus Interface 53 respectively. The CPU Bus Interface signals include ADS, CLK, CPURDY, CPURST, LDEV, LRDY, MIO, DC and WR. The IDE Bus Interface signals include DIOR, DIOW, DRDY, DRST, DCS16 and DINT. This Controlling State Machine 50 provides a plurality of control signals for the configuration, read and write operations.

The LBPI 3 has a Configuration Register 51 comprised of sixteen 8-bit registers. These registers store the LBPI parameters such as disk drive transfer rates and also a copy of the floppy compatibility register at 3F7h. Only three I/O port addresses are required for LBPI configuration purposes. These three I/O addresses can also be shared by up to four LBPIs on the same CPU local bus. Further, the I/O addresses are selectable to provide flexibility for different computer systems.

In order to maintain compatibility with computer systems with floppy drive(s) attached via the ISA Bus, an ISA Bus Interface 56 is also provided to couple the State Machine 50 to the ISA Interface 5. The ISA Bus Interface signals include IOCHRDY, IIOR, IRQ14 and RESET. Alternatively, on systems where both the hard drive IDE circuitry and the floppy drive circuitry are on the same printed circuit board, such as a "note book" computer, the ISA Interface 5 is not utilized by the LBPI 3.

Note that the LBPI State Machine 50 continuously "snoops" the control signals from the CPU 1 to the disk drives 10 and 11 to detect and to keep track of which of the disk drives 10 or 11 is currently active. This LBPI feature gives it the ability to automatically and dynamically toggle between two sets of timing parameters of disk drives 10 & 11 which in turn set signal timing for controlling data transfer rate. This capability allows the LBPI 3 to provide optimized performance for any pair of drives connected to it.

The LBPI 3 has control logic within the State Machine 50 which can make this decision without any additional special driver software, i.e. using only the generic PC BIOS code. This is a very advantageous feature since in a typical PC system this information is not available outside the disk drive unit.

The term "snoop" is used to mean that the LBPI 3 watches the address and data during the transfer but does not affect or participate in the transfer, other than to provide the data path from the CPU to the drive. In a conventional IBM PC AT or a compatible, the disk drive Drive/Head register is at system address 01F6h, with bit 4 containing the status of which drive is active. If this bit is 0, then drive 0 is active, and if this bit is 1, then drive 1 is active. Hence by "snooping" the transfers to the 01F6h register and recording the data in bit 4 of the disk drive register, the LBPI 3 is able to determine the current destination of the disk drive commands and hence maintain a record of the status of the currently active disk drive.

Figure 14A:
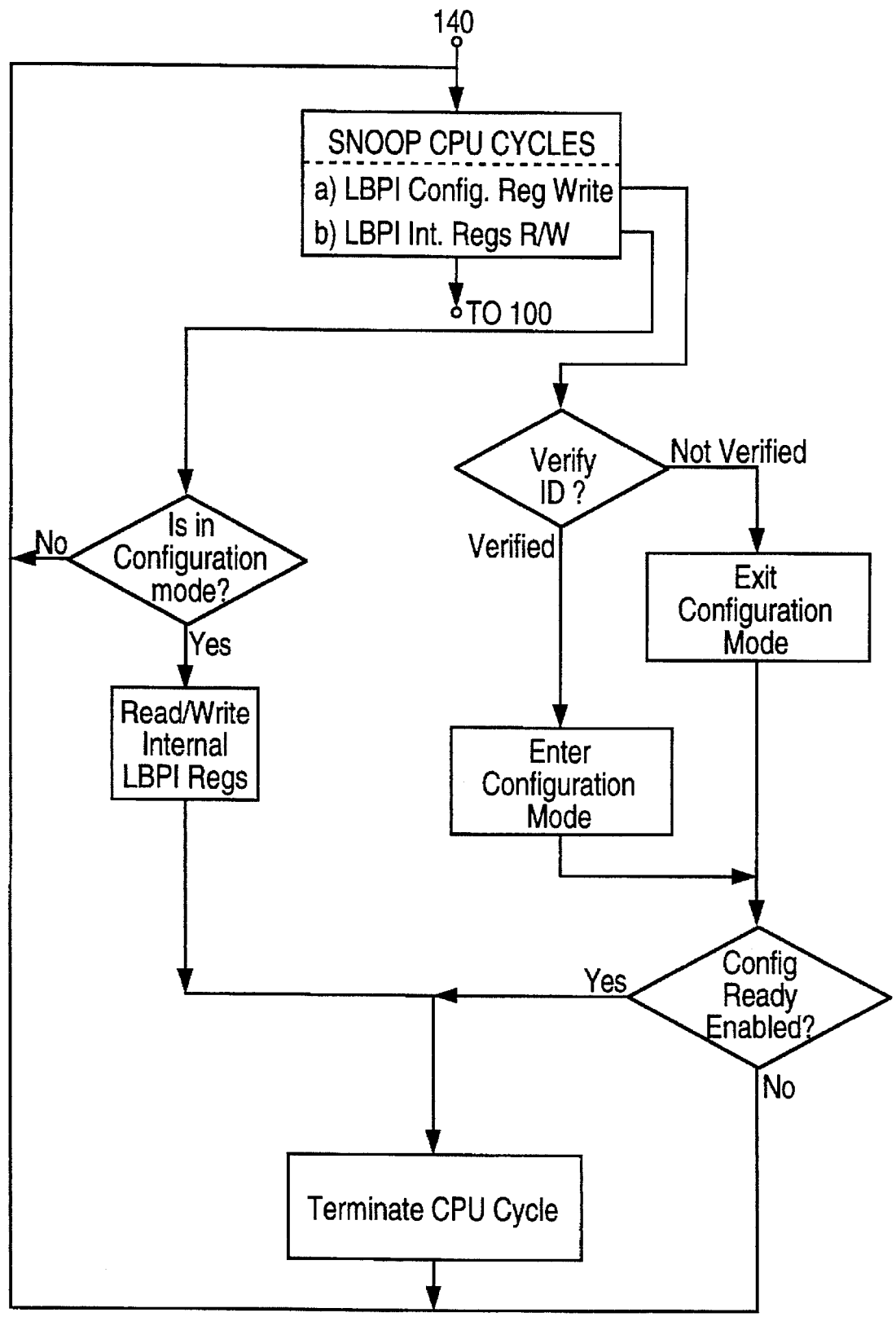
FIGS. 14a, 14b, 14c and 14d show the flow diagrams of the CPU-side State Machine (CSM) portion of the Controlling State Machine of the first embodiment.
Figure 14B:
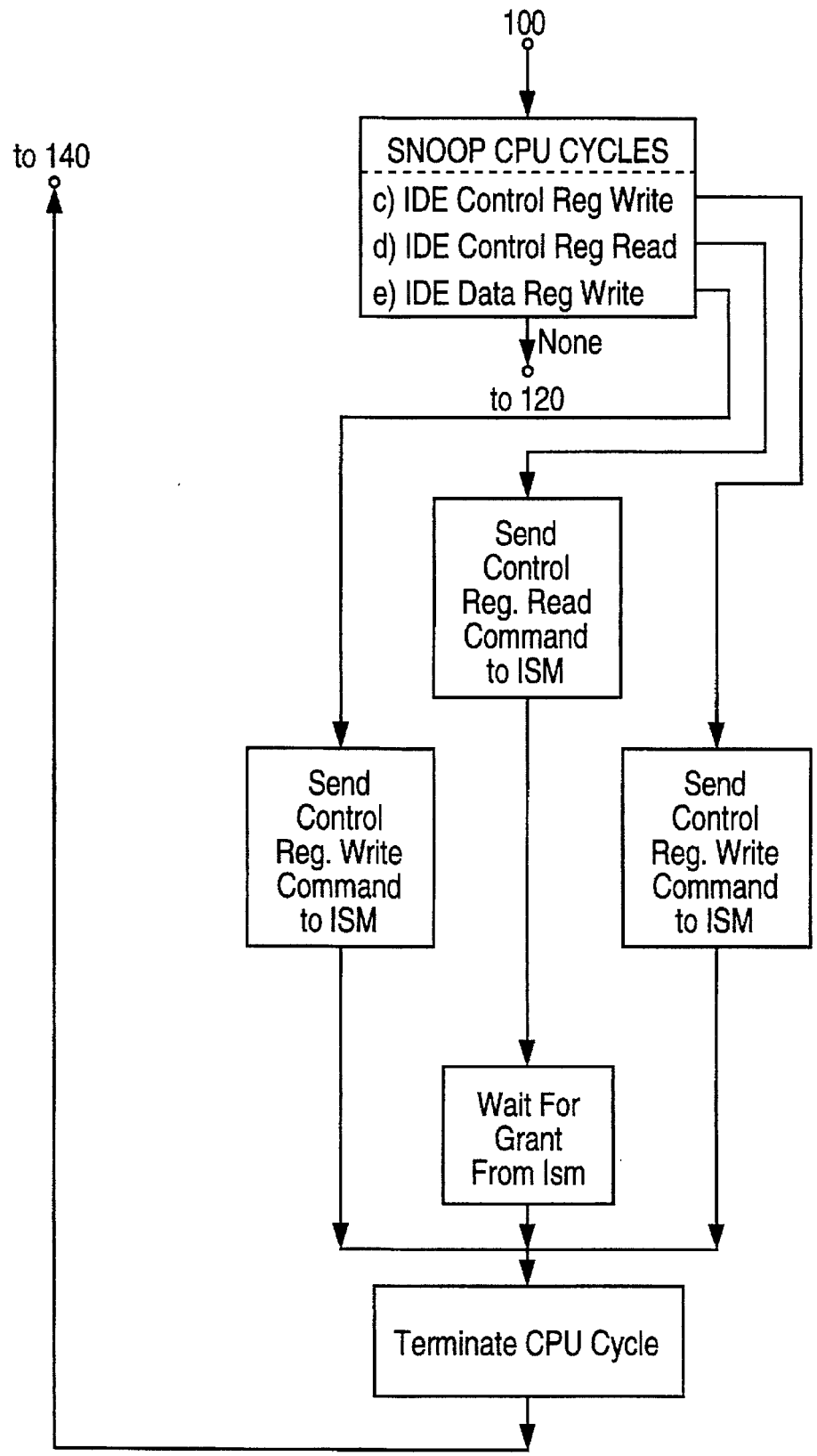
Figure 14C:
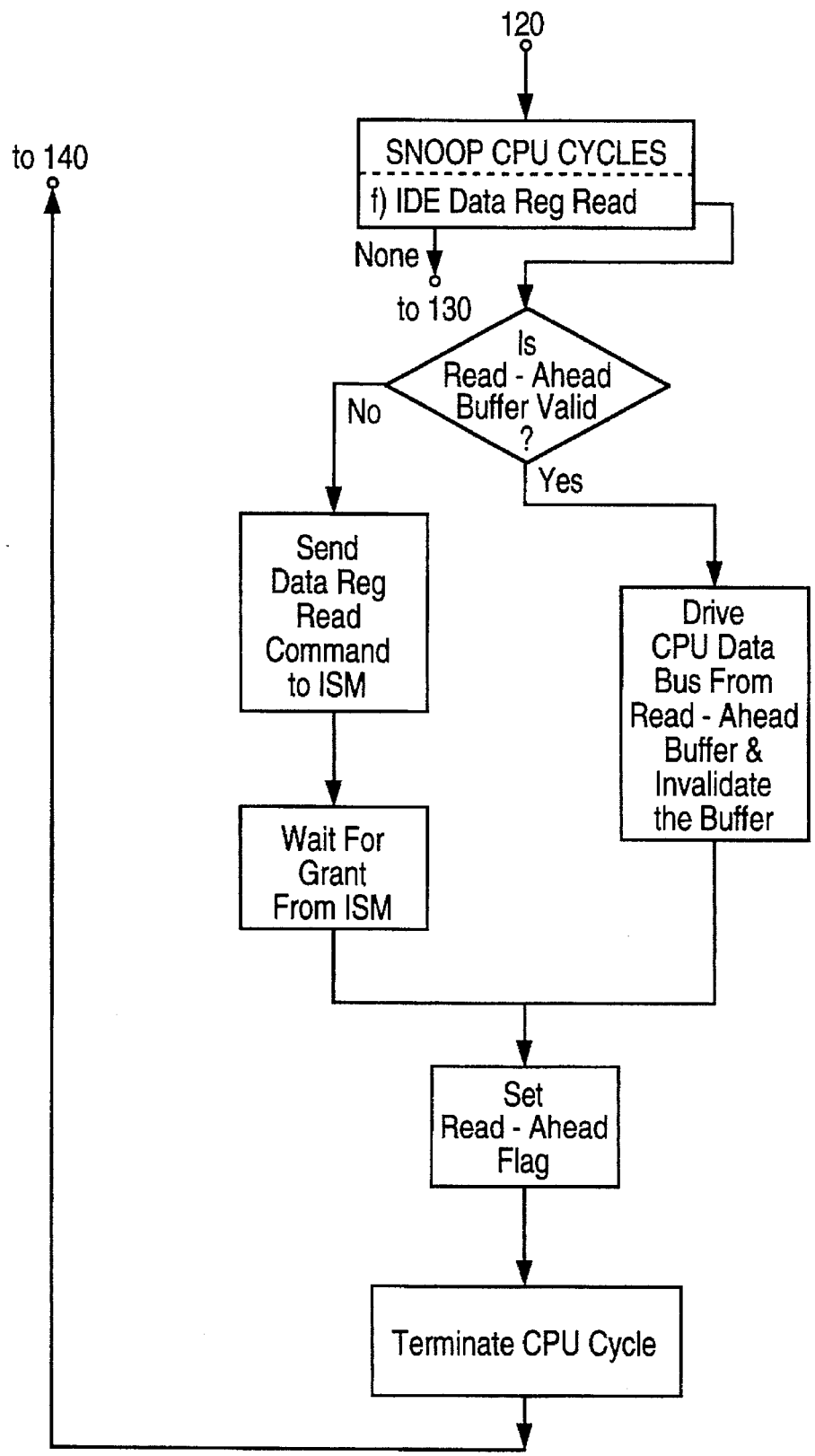
Figure 14D:
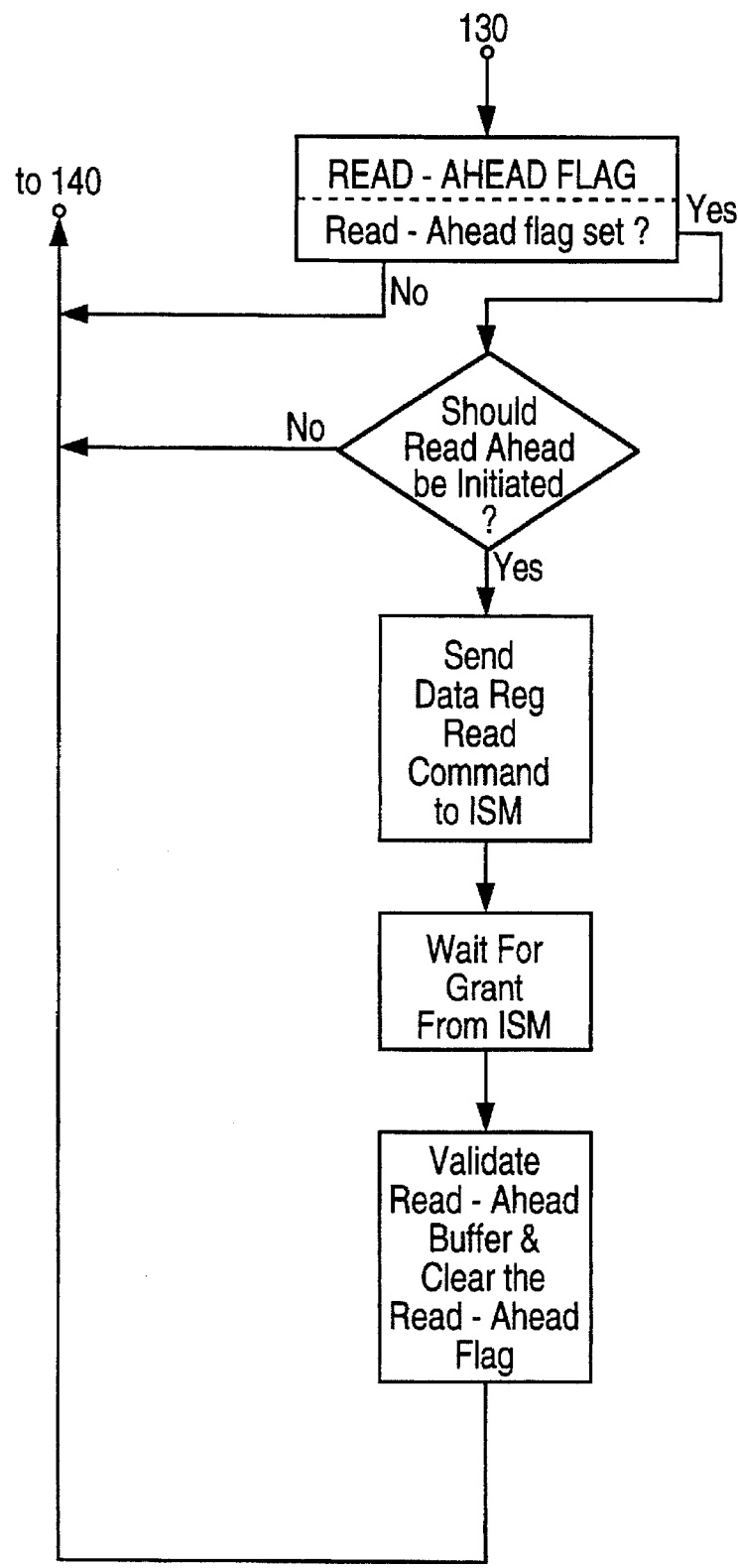

The other interconnections and interactions of the various data and address processing blocks to accomplish the pipelined operation of the LBPI 3 are best illustrated by ISM and CSM flow diagrams of FIGS. 13–14d and descriptions of Configuration, Disk Read and Disk Write operations performed by the LBPI 3 circuitry.

In a PC AT or compatible computer, a common method of data transfer to and from an IDE style hard disk drive is using "programmed I/O". Programmed I/O refers to a method where the CPU is directed by software to perform a read data operation followed by a write data operation to transfer data between a source and a destination. This technique was used for hard disk data transfers by IBM in their first PC AT systems and has continued as a standard capability in all PC compatibles today.

Figure 8A:
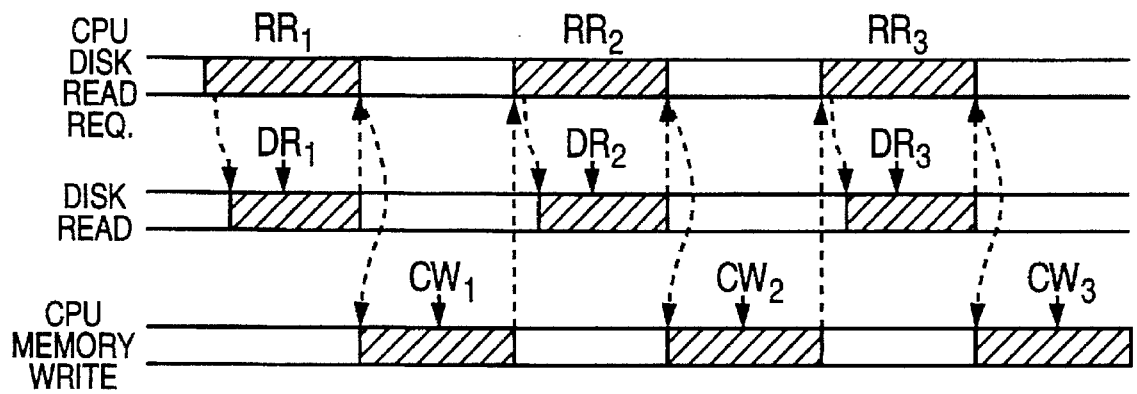
FIG. 8a shows three complete conventional ISA Bus disk read cycles wherein the CPU Memory Write is slower than the Disk Read (PRIOR ART).

FIG. 8a is a time line diagram showing three complete conventional ISA Bus disk read cycles wherein the CPU Memory Writes $CW_1$, $CW_2$ & $CW_3$ are slower than the Disk Reads $DR_1$, $DR_2$ & $DR_3$, using programmed I/O via the ISA Bus in a conventional PC system. The diagram shows a sequence of events with time increasing along the horizontal axis from left to right. Note that each Disk Read Request $RR_1$, $RR_2$ & $RR_3$ precede each Disk Read operation $DR_1$, $DR_2$ & $DR_3$, which in turn precedes each CPU Memory Write operation $CW_1$, $CW_2$ & $CW_3$ respectively.

For example, if disk drive 10 is selected and there is a data request from the CPU 1 to disk drive 10, a Disk Read Request $RR_1$ is sent to the disk drive 10. In response to the Request $RR_1$ the disk drive performs a Disk Read $DR_1$ and supplies data to the CPU 1. After the CPU 1 receives the data, it writes the data to the CPU memory during period $CW_1$. After the memory has accepted the data, the CPU 1 can then send a second Disk Read Request $DR_2$ for more disk data, and the sequence repeats itself in a similar serial manner until all the data required by the application software has been provided.

Figure 8B:
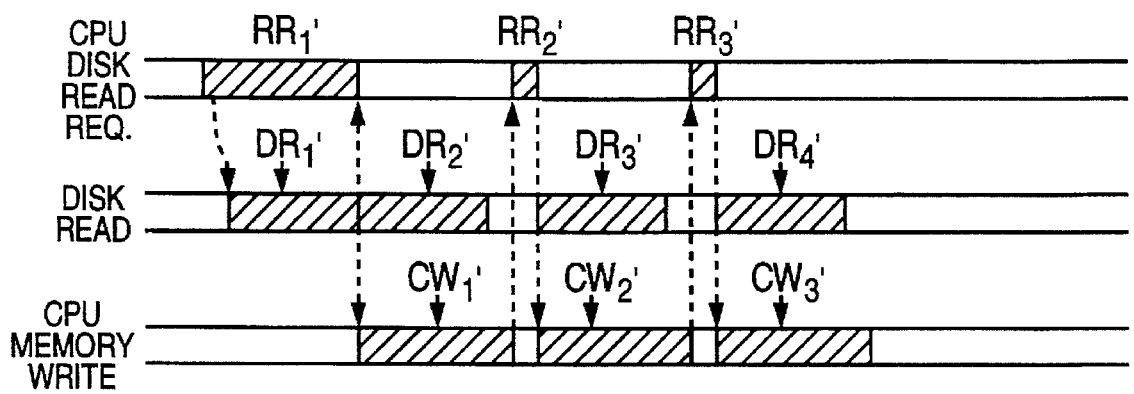
FIG. 8b shows three complete LBPI disk read cycles wherein the CPU Memory Write is slower than the disk read in accordance with the first embodiment.

FIG. 8b shows three complete LBPI disk read cycles in accordance with the first embodiment of the invention, wherein the CPU Memory Writes $CW_1$, $CW_2'$ & $CW_3'$ are slower than the Disk Reads $DR_1'$, $DR_2'$ & $DR_3'$. Again, a programmed I/O data transfer is initiated by the CPU 1. However, now the data transfer is via the faster Local Bus and the LBPI 3 is operating with a read-ahead mode enabled. FIG. 8b shows three horizontal lines of activity, with both the CPU 1 and one of the Disk Drives 10 or 11 are performing different operations simultaneously to yield a significant improvement in overall data transfer rate (speed).

For example, if disk drive 10 is active and there is a data request from the CPU 1 to disk drive 10, the first data transfer occurs just as in FIG. 8a. The CPU 1 sends a Disk Read Request $RR_1'$ to the disk drive 10 with the LBPI 3 passing the Request $RR_1'$ to the disk drive 10. The disk drive 10 performs a Disk Read $DR_1'$ and supplies the data to the CPU 1 through the LBPI 3 and the Local Bus. After the CPU 1 receives the data it performs a CPU Memory Write $C_{W1}$ to memory.

One of the advantages of the invention over the conventional ISA Bus PC system is the ability of the LBPI 3 to automatically begin reading the next "chunk" of data during $DR_2'$ from the disk drive 10, while the CPU is still writing the first "chunk" of data to the CPU memory. This reading ahead is a first of four LBPI Read-Ahead modes in operation and represents the system level concurrency that the LBPI 3 can provide. The new disk data is stored in the Read Ahead Buffer 73 until the CPU requests it.

Since PC DOS organizes data in 512-byte sectors, there is a very high probability that the next 16 bits of data to be requested is also the next contiguous 16 bits on the disk drive within the 512-byte sector. Referring back to FIG. 7, by using the Read-Ahead feature and maintaining a count of the number of 16-bit words already read in the Read Ahead Counter 54, the LBPI 3 can further increase the speed of disk reads by using the LBPI disk read pipeline comprising of the IDE Data In Latch 72 and the Read Ahead Buffer 73, to read and hold the next 16-bit word "chunk" in anticipation of the next Disk Read Request.

The system handshaking between the CPU 1 and the LBPI 3 for a disk read occurs in the following manner. When the LBPI 3 detects a read address match in the IDE hard disk range, it first sends a LDEV signal to the CPU 1 through the CPU Bus Interface 52. This signals the CPU 1 that there is a local bus device that will communicate during the data transfer cycle and has the effect of preempting a conventional ISA Bus cycle. If the data is already in the Read Ahead Buffer 73, the LBPI 3 outputs the data to the CPU 1 and pulls the LRDY line low via the CPU Bus Interface 52. On the other hand, if the data is not in the Read Ahead Buffer 73 and the CPU 1 requests a 16-bit word transfer, the LBPI 3 internally generates one IDE Disk Read to read a 16-bit word via an IDE Data In Multiplexer (MUX) 71 and a Data In Latch 72, from the selected disk drive 10 or 11. If the CPU requests a 32-bit word, then the LBPI 3 internally generates two IDE Disk Read to read a 32-bit word, in two 16-bit "chunks" via the same data path but latches the two 16-bit "chunks" as a high word and a low word into the Data In Latch 72. After the data is transferred through the CPU Data In MUX 74 to the CPU local bus, the LBPI 3 signals the CPU 1 by pulling the LRDY Line low.

The LBPI 3 also has three other Read-Ahead modes of operation. The second Read-Ahead mode is the Read-ahead Command Monitor mode. In this mode, the LBPI 3 not only watches for a disk drive address match, it also watches or "snoops" the disk drive commands from the CPU 1. In order to set up a disk drive operation, the CPU 1 has to send commands to the IDE disk drive(s) such as Read-Long, Read-Sector, Read-Buffer, Read-Multiples, etc. For example, prior to reading a new data sector, the CPU 1 has to send commands to the disk drive, which includes information about the new sector location and the type of disk read operation. These commands are passed along by the LBPI 3 to the disk drives and more importantly are also used by the Controlling State Machine 50 to anticipate when the selected disk drives 10 or 11 is about to receive the next read data command. The LBPI 3 is then able to generate its next Read Disk command to the disk drive at the appropriate time, in anticipation of the next Read Disk command from the CPU 1. In this command mode, the Read Ahead Counter 54 is used as in the first Read Ahead Mode. Commands that generate read-ahead activity are Read-Sectors-With-Retry, Read-Sectors-Without-Retry, Read-Buffer and Read-Multiple. This is the most flexible of the four Read-Ahead modes.

The third Read-ahead mode is a diagnostic mode in which the Read Ahead Counter 54 is ignored. The LBPI 3 continuously reads the next "chunk" of data from the disk drive and ignores the Read Ahead Counter 54. The fourth Read-ahead mode allows the LBPI 3 to dynamically program the count in the Read Ahead Counter 54. Another feature of the read-ahead mode is that data is always supplied from the same I/O address location on each transfer, thereby maintaining compatibility with the generic PC BIOS code.

Figure 9A:
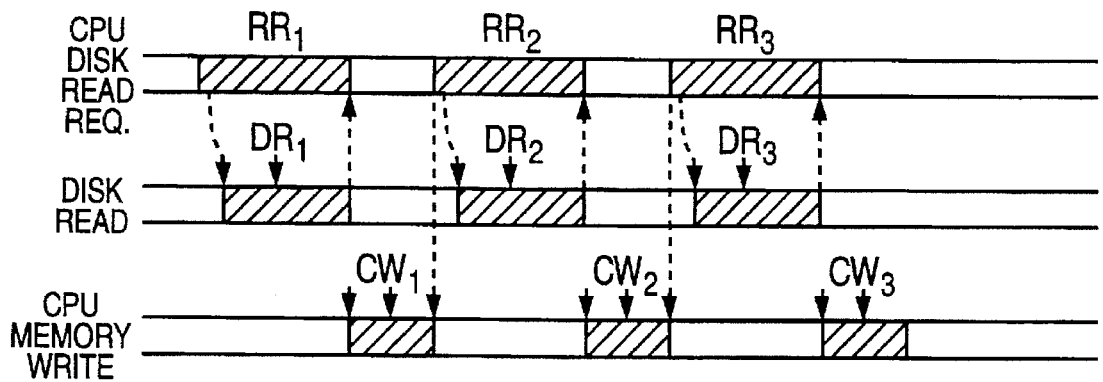
FIG. 9a shows three complete conventional ISA Bus disk read cycles wherein the CPU Memory Write is faster than the Disk Read (PRIOR ART).

FIG. 9a shows three complete conventional ISA Bus disk read cycles wherein the CPU Memory Writes $CW_1$, $CW_2$ & $CW_3$ are faster than the Disk Reads $DR_1$, $DR_2$ & $DR_3$, using programmed I/O via the ISA Bus in a conventional PC system. The sequence of serial events are performed in a very similar serial manner to that of FIG. 8a with each Disk Read Request $RR_1$, $RR_2$ & $RR_3$ preceding each Disk Read operation $DR_1$, $DR_2$ & $DR_3$, which in turn precedes each CPU Memory Write operation $CW_1$, $CW_2$ & $CW_3$ respectively.

Figure 9B:
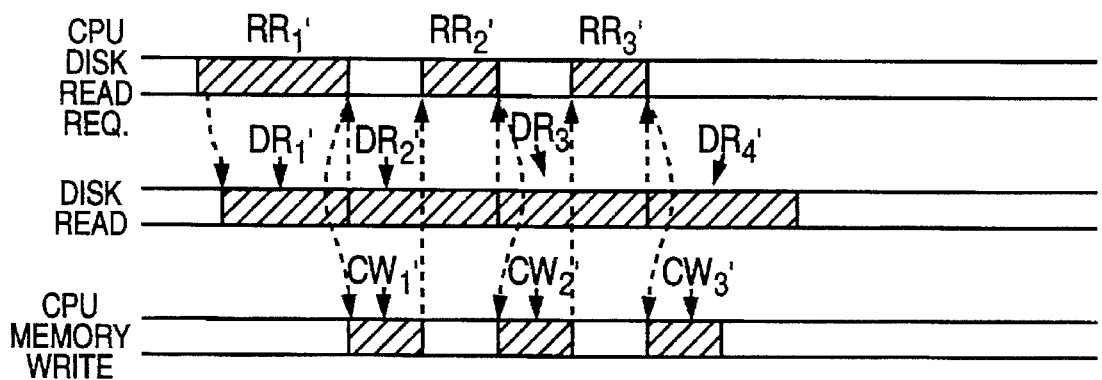
FIG. 9b shows three complete LBPI disk read cycles wherein the CPU Memory Write is faster than the Disk Read.

FIG. 9b shows three complete LBPI disk read cycles wherein the CPU Memory Writes $CW_1'$, $CW_2'$ & $CW_3'$ are faster than the Disk Reads $DR_1'$, $DR_2'$ & $DR_3'$ in accordance with the first embodiment of the invention. Again, a programmed I/O data transfer is initiated by the CPU 1. However, now the data transfer is via the faster CPU local bus and the LBPI 3 is operating with a read-ahead mode enabled, and with both the CPU 1 and one of the Disk Drive 10 or 11 is performing different operations simultaneously.

For example, if disk drive 10 is active and there is a data transfer request from the CPU 1 to disk drive 10, the first data transfer occurs just as in FIG. 9a. However, now the LBPI 3 automatically begins reading the next "chunk" of data during $DR_2'$ from the disk drive 10, while the CPU is still writing the first "chunk" of data to the CPU memory. The new disk data is stored in the Read Ahead Buffer 73 until the CPU requests it.

FIGS. 8b and 9b show somewhat idealized event sequences. Since either the memory, CPU, or disk drive, will be a slower device (the performance bottleneck), the LBPI 3 will insert "dead" periods to guarantee that the event sequence is not corrupted.

Figure 10A:
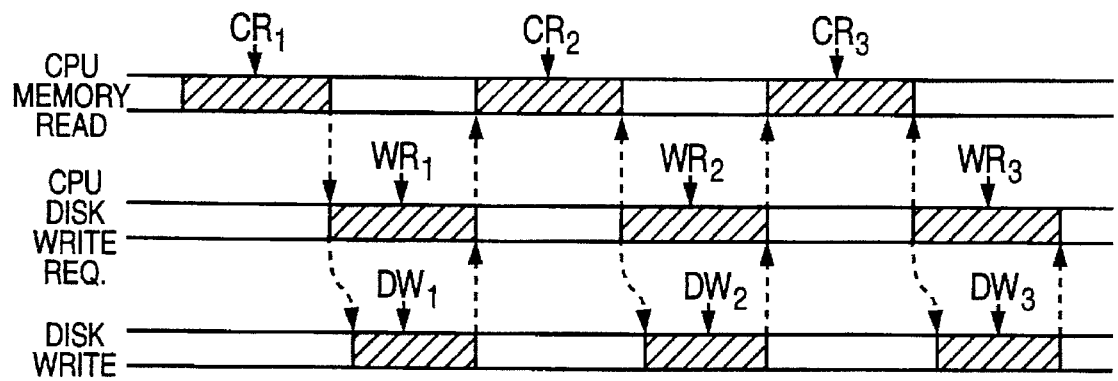
FIG. 10a shows three complete conventional ISA Bus disk write cycles wherein the CPU Memory Read is slower than the Disk Write (PRIOR ART).

FIG. 10a shows three complete conventional ISA Bus disk write cycles wherein the CPU Memory Reads $CR_1$, $CR_2$ & $CR_3$ are slower than the Disk Writes $DW_1$, $DW_2$ & $DW_3$. The sequences of serial events are very similar to the conventional read cycles using the ISA Bus, with the CPU Memory Reads $CR_1$, $CR_2$ & $CR_3$ preceding the Disk Write Requests $WR_1$, $WR_2$ & $WR_3$, which in turn precedes the Disk Writes $DW_1$, $DW_2$ & $DW_3$.

Figure 10B:
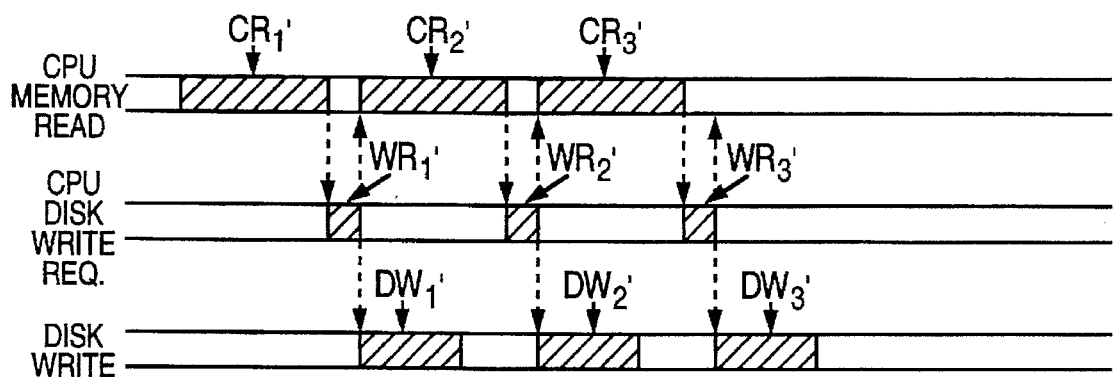
FIG. 10b shows three complete LBPI disk write cycles wherein the CPU Memory Read is slower than the Disk Write.

FIG. 10b shows three complete LBPI disk write cycles wherein the CPU Memory Reads $CR_1'$, $CR_2'$ & $CR_3'$ are slower than the Disk Writes $DW_1'$, $DW_2'$ & $DW_3'$ in accordance with the invention. On disk write operations, because of the Posted-Write capability of the LBPI 3, there is also system level concurrency. The Posted-Write operation begins with a CPU Memory Read $CR_1'$. This is followed by a transfer into the LBPI's 3 Data Out Latch 61 when the LBPI 3 receives a Disk Write Request $WR_1'$ command from the CPU 1. Next the LBPI 3 transfers the data to the disk drive followed by a Disk Write $DW_1'$. In the meantime, the CPU 1 is allowed to simultaneously perform a CPU Memory Read $CR_2'$ and read the next "chunk" of data from the CPU memory, thereby starting the sequence over.

Referring back to FIG. 7, the system handshaking between the CPU 1 and the LBPI 3 for a disk write occurs in the following manner. When the LBPI 3 finds write address match in the IDE hard disk range, it pulls the LDEV line of the CPU Bus Interface 52 low. This signals the CPU 1 that there is a CPU local bus device that wants access to the CPU 1 and has the effect of preempting a conventional ISA Bus cycle. When the CPU data is valid, it is latched into the Data Out Latch 61. Upon latching the data, the LBPI 3 releases the CPU 1 by signalling on the LRDY line and the CPU 1 is able to start a new operation on the CPU local bus. The data is then transferred by the LBPI 3 to the disk drive in 16-bit "chunks" through a Data Out MUX 62. The appropriate data transfer rate is regulated by the disk drive parameters stored in the Configuration Register 51. The LBPI 3 is capable of sending different "chunk" sizes to the disk drive if required.

Figure 11A:
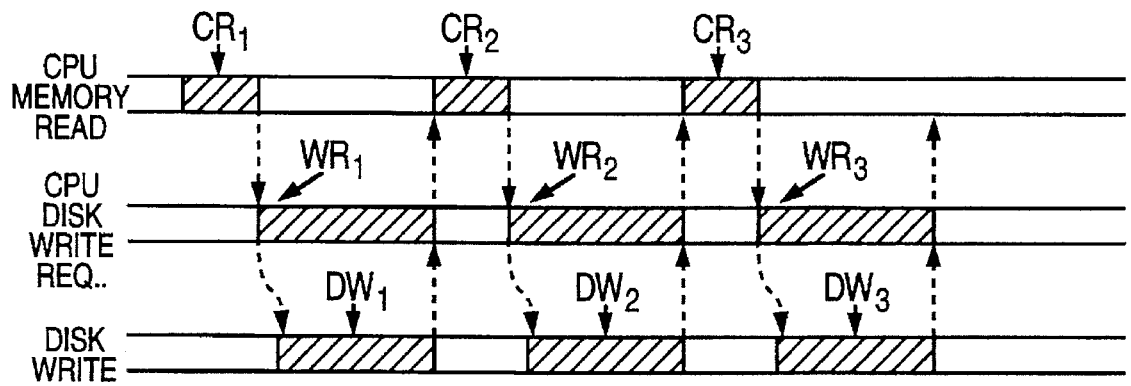
FIG. 11a shows three complete conventional ISA Bus disk write cycles wherein the CPU Memory Read is faster than the Disk Write (PRIOR ART).

FIG. 11a shows three complete conventional ISA Bus disk write cycles wherein the CPU Memory Reads $CR_1$, $CR_2$ & $CR_3$ are faster than the Disk Writes $DW_1$, $DW_2$ & $DW_3$, using programmed I/O via the ISA Bus in a conventional PC system today. The sequence of events are performed in a very similar serial manner to that of FIG. 10a except now the CPU Memory Read is faster than the Disk Write.

Figure 11B:
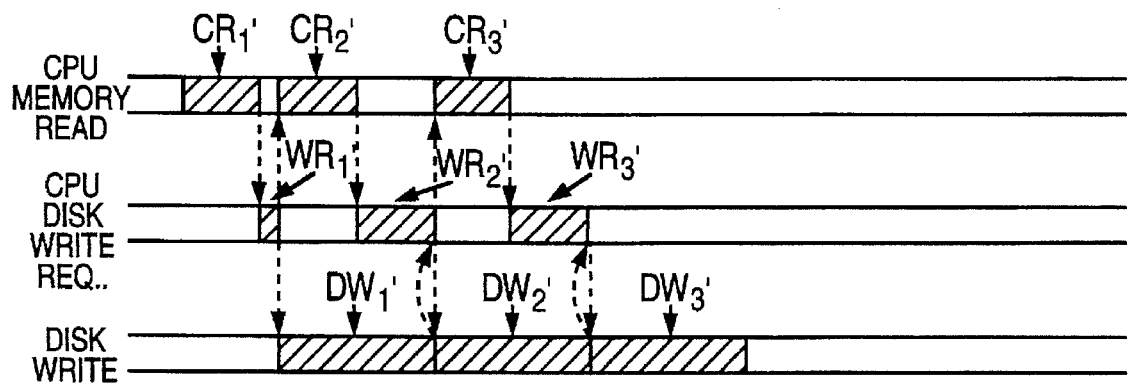
FIG. 11b shows three complete LBPI disk write cycles wherein the CPU Memory Read is faster than the Disk Write.

FIG. 11b shows three complete LBPI disk write cycles wherein the CPU read is faster than the disk write. Again, the sequence of events are performed in a very similar manner to that of FIG. 10b except now the CPU Memory Read is faster than the Disk Write.

In some embodiments, one or both the LBPI read-ahead and posted-write capabilities can be extended from the one 32-bit double word register (it offers the lowest cost with the greatest relative system performance gain) to multiple words, full disk sectors (typically 512 bytes), multiple sectors, full disk tracks, and even multiple tracks. These variations would require a larger register or increased memory capability, either inside or external to LBPI 3.

The LBPI 3 features both a 32-bit host CPU data path and a standard 16-bit IDE (ATA) disk drive data path. The 32-bit host interface provides capabilities for additional IDE disk drive operations. In a conventional PC system, the IDE disk drives are limited to a 16-bit data bus and there appears to be no obvious advantage in having a 32-bit CPU local bus interface, with the LBPI 3 providing the capability to assemble (or disassemble for a write) two 16-bit words into a 32-bit double-word for transfers with the CPU 1. However, a disk data read transfer is always a read-from-disk, followed by a write-to-memory (or vice versa for a, disk write operation). This means that the CPU 1 with a 32-bit LBPI 3 only needs to perform half as many transfer cycles as in a conventional implementation, thereby significantly boosting overall performance.

Yet another unique feature of the LBPI 3 advantageous to the operation of 32-bit host transfers is the ability to freeze (or maintain) a fixed address to the IDE data port. In a conventional PC, the IDE data port for the disk drive is located at I/O address 01F0H. Within the 80×86 family CPU architecture of a conventional PC a double-word of data is typically split into 4 bytes of data each with a contiguous but different address. Thus a 32-bit transfer to an 8-bit device would normally generate 4 cycles at I/O address addr+0, addr+1, addr+2 and addr+3. A conventional 32-bit transfer to the 01F0h port for a 16-bit device would result in two transfer cycles being generated, the first at address 01F0h and the second at 01F2h. Therefore, by using the conventional 16-bit transfer operation, the second word of data would not reach the 01F0h register where it is needed for a proper 32-bit data transfer from the CPU 1 to the selected disk drive 10 or 11.

The LBPI 3 solves this problem by identifying a 32-bit data transfer beginning at address 01F0h. When this condition is identified the LBPI 3 responds by fixing the IDE bus address at 0h (note that there is only a 3-bit address outputted to the disk) and transferring all data requested by the CPU 1 (in two word cycles or four byte cycles as specified by the drive). This feature is implemented so that byte transfers to the disk drive configuration registers at addresses 01F1h, 01F2h and 01F3h are properly processed. The apparent conflict in addresses is resolved dependent upon the 4 byte enable signals BE0, BE1, BE2 and BE3 provided by the CPU 1.

Figure 5:
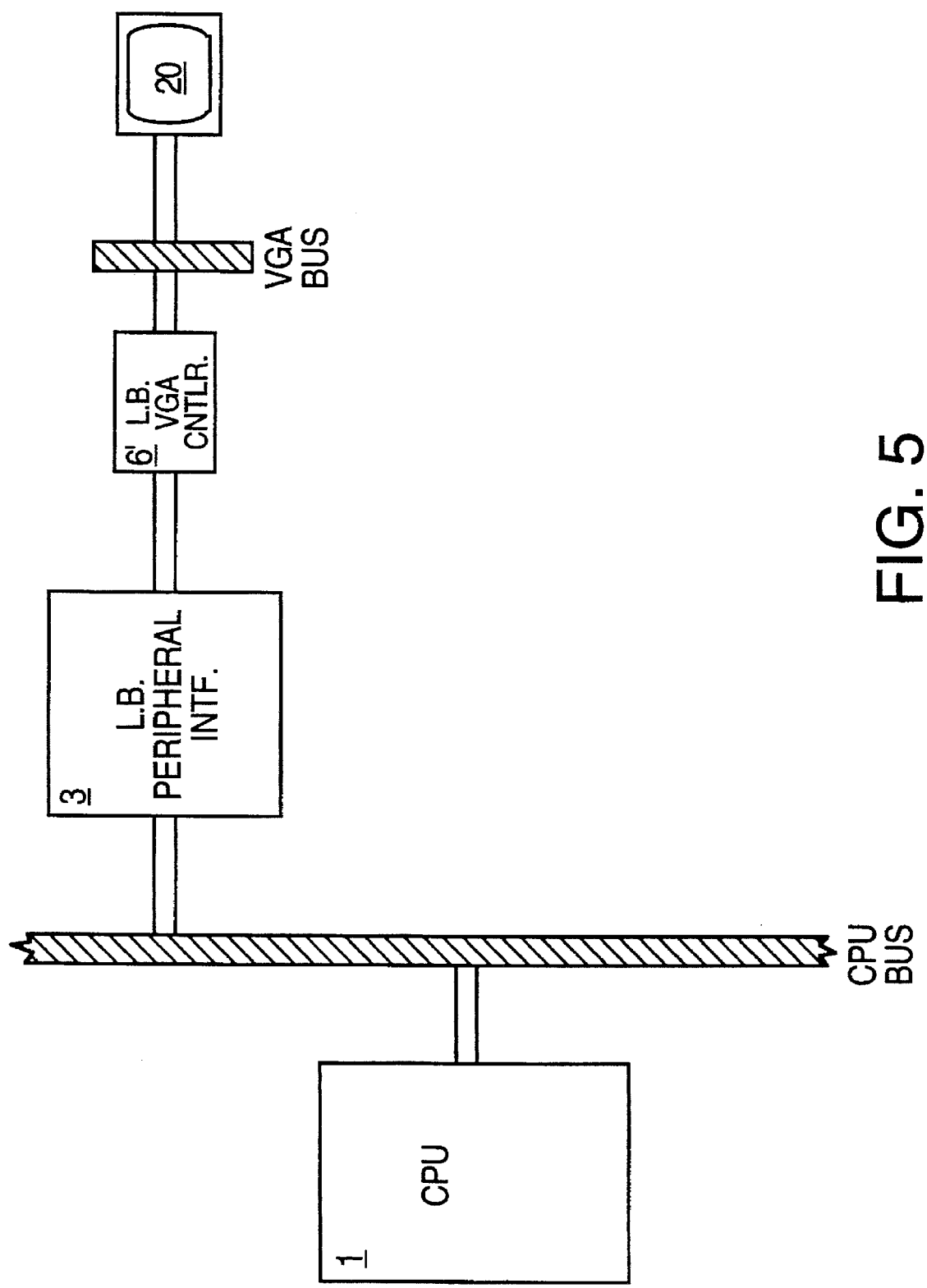
FIG. 5 shows a block diagram of a second embodiment of a LBPI between a CPU and a graphics device.

FIG. 5 shows a block diagram of a second embodiment of a Local Bus Peripheral Interface between a CPU and a graphics device interface in accordance with the invention. The principles of the efficient modes of pipelined read/write operations, described above in greater detail for the first embodiment having an IDE interface, are equally applicable to a graphics device interface such as VGA or SVGA.

Figure 6:
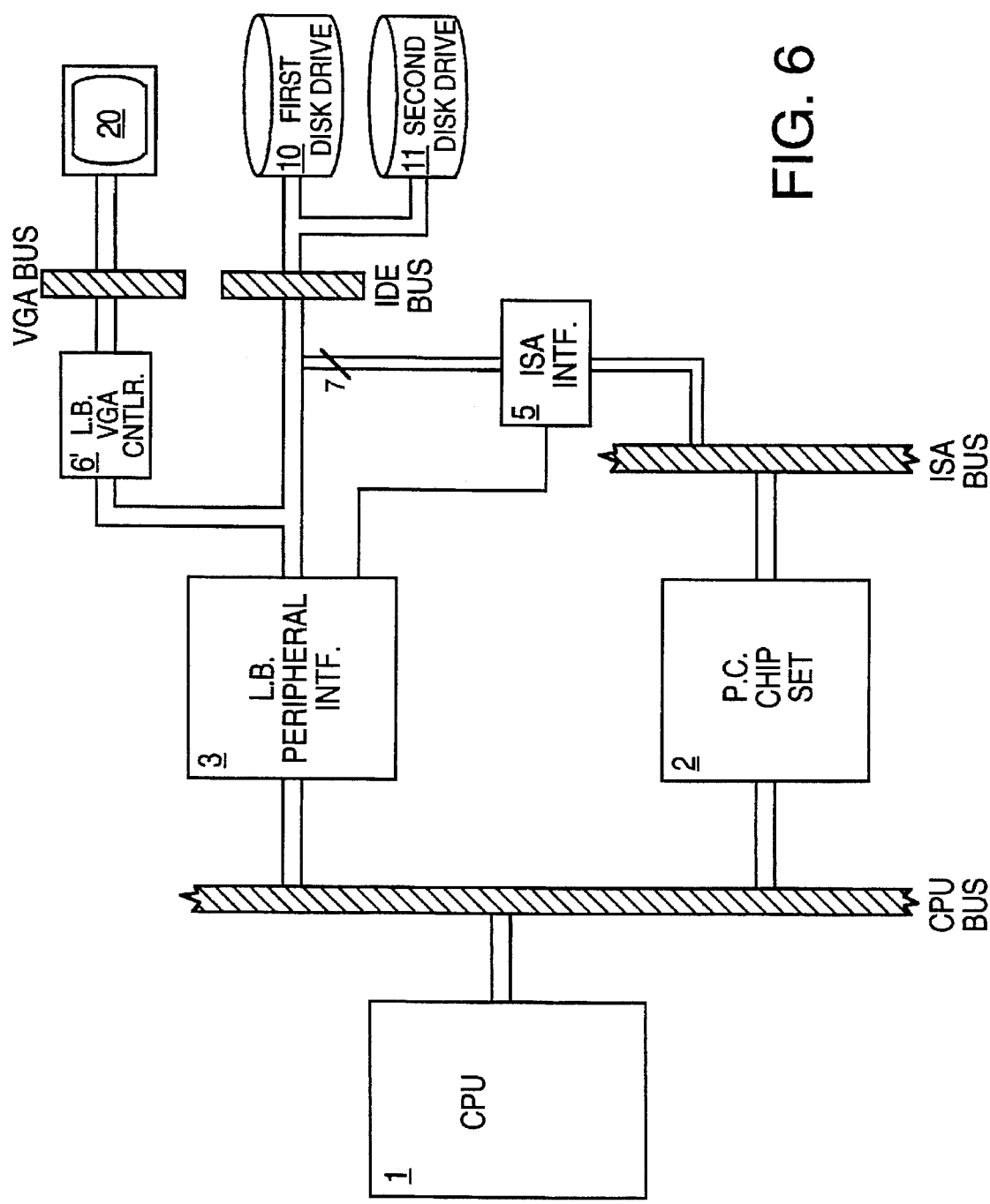
FIG. 6 shows a block diagram of a third embodiment of a LBPI between a CPU and a pair of hard drives and a graphics device.

FIG. 6 shows a block diagram of a third embodiment of a Local Bus Peripheral Interface between a CPU and a pair of hard drives and a graphics device.

Figure 15:
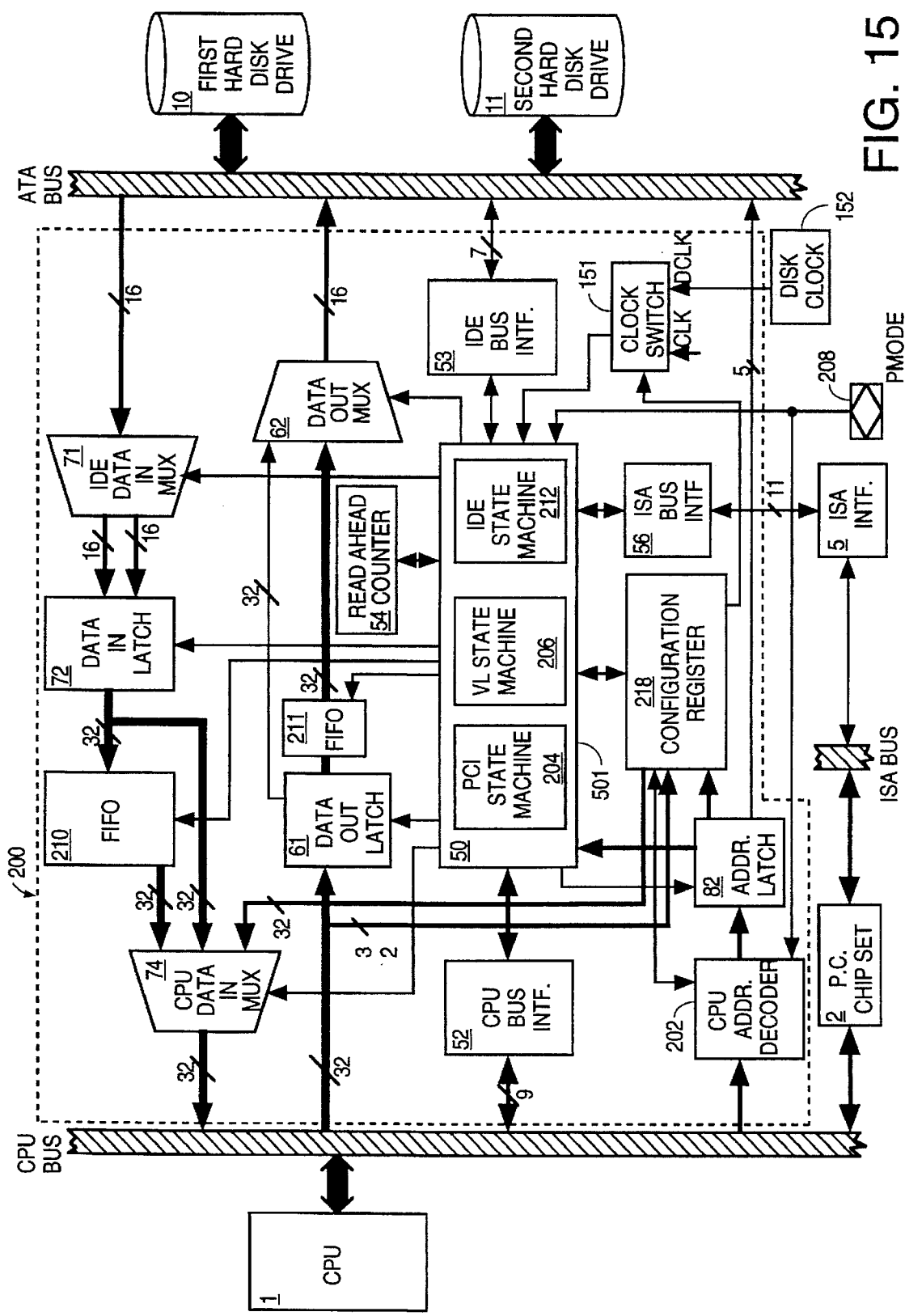
FIG. 15 shows a block diagram of an embodiment of the present invention that provides PIO-protocol to DMA-protocol translation.

FIG. 15 shows a block diagram of an embodiment of the present invention that provides PIO-protocol to DMA-protocol translation. LBPI 200 interfaces with CPU 1 and includes CPU address decoder 202 coupled to the CPU bus, which for this embodiment can be either a VL bus or PCI bus. The output of CPU address decoder 202 is coupled to address latch 82, which is coupled to a PCI state machine 204 and VL state machine 206 in controlling state machine 501. Controlling state machine 501 includes PCI state machine 204, VL state machine 206 and IDE state machine 212. CPU address decoder 202, and PCI and VL state machines 204 and 206 are also coupled to a PMODE pin 208, which in turn is respectively coupled to either power or ground terminals when the computer local bus is either a PCI or VL bus. PCI and VL state machines 204 and 206 output control signals to 32-bit wide FIFOs 210 and 211, CPU bus interface 52, and IDE state machine 212 within controlling state machine 501. The output leads of FIFO 210 are coupled to the CPU bus via CPU data in multiplexer 74, whereas the input leads of FIFO 210 are coupled to the IDE bus via data in latch 72 and IDE data in multiplexer 71. The input leads of FIFO 211 are coupled to CPU bus via data out latch 61, whereas the output leads of FIFO 211 are coupled to the IDE bus via data out multiplexer 62. Configuration register 218 is coupled to CPU address decoder 202 via address latch 82, and is also coupled controlling state machine 501, and the CPU bus. For operation when the CPU bus is a PCI bus, a direct connection from CPU address decoder 202 to configuration register 218 provides address information to configuration register 218.

SELECTABLE HOST-SIDE INTERFACE

LBPI 200 is selectably configured to couple on the host side to either a PCI bus or VL bus by tying PMODE pin 208 to either power or ground terminals, respectively. When PMODE pin 208 is tied to a power terminal, PCI state machine 204 is enabled and VL state machine 206 is disabled. Conversely, when PMODE pin 208 is tied to a source of ground potential, PCI state machine 204 is disabled and VL state machine 206 is enabled. CPU address decoder 202 also receives the signal on PMODE pin 208 so that CPU address decoder 202 can decode the address signals according to the selected computer local bus protocol.

PCI and VL state machines 204 and 206 provide the signals to operate the CPU bus interface 52, depending on whether the PCI bus or VL bus is selected via PMODE pin 208. The PCI protocol is defined in the PCI Local Bus Specification, Revision 2.0, Apr. 30, 1993, attached hereto designated as APPENDIX 2 which is a part of this application and is incorporated herein by reference in its entirety. The VL protocol is defined in the VESA Local Bus Specification attached hereto designated as APPENDIX 3 which is a part of this application and is incorporated herein by reference in its entirety.

PIO DATA TRANSFERS

LBPI 200 supports PIO data transfers (e.g., the read sector(s) with retry command, which is command code 20h as shown below in Table 1) in a manner similar to LBPI 3 (FIG. 7) described above, except that: CPU address decoder 81 is replaced by CPU address decoder 202; read ahead buffer 73 replaced by FIFO 210; FIFO 211 is added between data out latch 61 and data out multiplexer 62; and configuration register 51 is replaced by configuration register 218. Controlling state machine 501 includes PCI, VL, and IDE state machines 204, 206, and 212.

The host sends commands to the selected disk drive's command block registers, at addresses 1F1h–1F7h and 3F6h–3F7h, to request PIO and DMA data transfers. LBPI 200 "bridges" these commands directly to the ATA bus. To accomplish the bridging, CPU address decoder 202 recognizes these color, Lands, and via configuration register 218 and either the PCI state machine 204 (or VL state machine 206), control signals are provided to data out latch 61 to enable transfer of the host commands to data out multiplexer 62. This path bypasses FIFO 211 and therefore command and status register writes are provided more quickly to the ATA bus. The terms ATA bus and IDE bus are used interchangeably. Similarly, the IDE protocol is the same as the ATA protocol described below. Table 1 below lists all the commands and codes defined for the ATA protocol.

TABLE 1

| COMMAND | COMMAND CODE |
| --- | --- |
| Acknowledge media chge | DBh |
| Boot - post-boot | DCh |
| Boot - pre-boot | DDh |
| Check power mode | 98h E5h |
| Door lock | DEh |
| Door unlock | DFh |
| Execute drive diagnostic | 90h |
| Format track | 50h |
| Identify drive | ECh |
| Idle | 97h E3h |
| Idle immediate | 95h E1h |
| Initialize drive parameters | 91h |
| NOP | 00h |
| Read buffer | E4h |
| Read DMA (w/ retry) | C8h |
| Read DMA (w/o retry) | C9h |
| Read long (w/ retry) | 22 |
| Read long (w/o retry) | 23 |
| Read multiple | C4h |
| Read sector(s) (w/ retry) | 20 |
| Read sector(s) (w/o retry) | 21 |
| Read verify sector(s) (w/ retry) | 40 |
| Read verify sector(s) (w/o retry) | 41 |
| Recalibrate | 1xh |
| Seek | 7xh |
| Set features | EFh |
| Set multiple mode | C6h |
| Sleep | 99h E6h |
| Standby | 96h E2h |
| Standby immediate | 94h E0h |
| Write buffer | E8h |
| Write DMA (w/ retry) | CAh |
| Write DMA (w/o retry) | CBh |
| Write long (w/ retry) | 32 |
| Write long (w/o retry) | 33 |
| Write multiple | C5h |
| Write same | E9h |
| Write sector(s) (w/ retry) | 30 |
| Write sector(s) (w/o retry) | 31 |
| Write verify | 3Ch |
| Vendor unique | 9Ah |
| Vendor unique | C0–C3h |
| Vendor unique | 8xh |
| Vendor unique | F0h–FFh |
| Reserved: all remaining codes | — |

CPU address decoder 202 is similar to CPU address decoder 81 (FIG. 7), but includes logic to recognize addresses in PCI bus protocol as well as VL bus protocol.

FIFO 210 improves the concurrent operation of LBPI 200 by allowing storage of more data words. LBPI 200 can continue to read data from the designated disk drive until FIFO 210 is full, rather than only being able to read ahead one data transfer as is the case for LBPI 3. Similarly, FIFO 211 improves concurrent operation of LBPI 200 during data writes to the designated disk drive.

Configuration register 218 is similar to configuration register 51 (FIG. 7), but includes twenty-six 32-bit registers instead of sixteen 8-bit registers as in configuration register 51. The extra register space in configuration register 218 is used to support the DMA capability and the VL and PCI bus interfaces.

IDE state machine 212 provides signals to operate IDE bus interface 53 in accordance with the parameters for the selected disk drive stored in configuration register 218 and the ATA specification (see APPENDIX 1).

DMA DATA TRANSFERS

To perform a DMA transfer with a disk drive that supports DMA capability, the host sends one of the DMA transfer commands, such as Read DMA with Retry (command code C8h shown in Table 1). CPU address decoder 202 recognizes the address this command is written to and causes the command to be bridged around FIFO 211 to the designated disk drive on the ATA bus in the manner described above. IDE state machine 212 snoops these commands (similar to description above for PIO commands) and, in conjunction with the disk drive parameters stored in configuration register 218, sends control signals to IDE bus interface 53 to provide the proper handshaking signals for DMA data transfers (see Appendix 1) when CPU 1 requests data from address 1F0h.

The DMA feature of LBPI 200 allows CPU 1 to make DMA transfer requests, even though the CPU bus (either a PCI or VL bus) does not provide the signals needed for IDE DMA transfers. A further advantage is that CPU 1 continues to use PIO reads (or writes) to address 1F0h to read or write data to the hard drive, while LBPI 200 operates the ATA bus interface in DMA mode. Thus, the DMA operation is transparent to CPU 1. This feature may be advantageously used in systems where either disk drive 10 or 11 or both have a DMA data transfer bandwidth that is faster than the disk drives' PIO data transfer bandwidth. A disk drive's DMA data transfer bandwidth will typically be greater than the disk drive's PIO data transfer bandwidth because of the disk drive's internal buffer management.

Further, because this feature is controlled by the driver software executed by CPU 1, LBPI 200 can dynamically switch between DMA and PIO data transfers. Moreover, because LBPI 200 fully supports PIO transfers, LBPI 200 is fully backwards compatible not only with driver software that does not support DMA transfers but also with disk drives that do not support DMA transfers.

To enable a reduction in overall transfer time of data from the peripheral devices (10,11) to the CPU bus when the CPU is running at a slower than normal clock rate to conserve energy, LBPI 200 includes clock switch 151 which applies the disk clock signal (DCLK), generated by disk clock 152, to IDE state machine 212. Configuration register 218 is connected to clock switch 151 and provides a control signal which controls connection of either CLK (from the CPU bus) or DCLK to IDE state machine 212 depending on the clock rate of the CPU. If the CPU clock rate is a slower, energy saving rate, the clock switch 151 is controlled to provide DCLK to IDE state machine 212, thereby enabling transfer of data from a peripheral device to FIFO 210 at a faster rate than if the CLK signal was provided to IDE state machine 212.

Figure 16A:
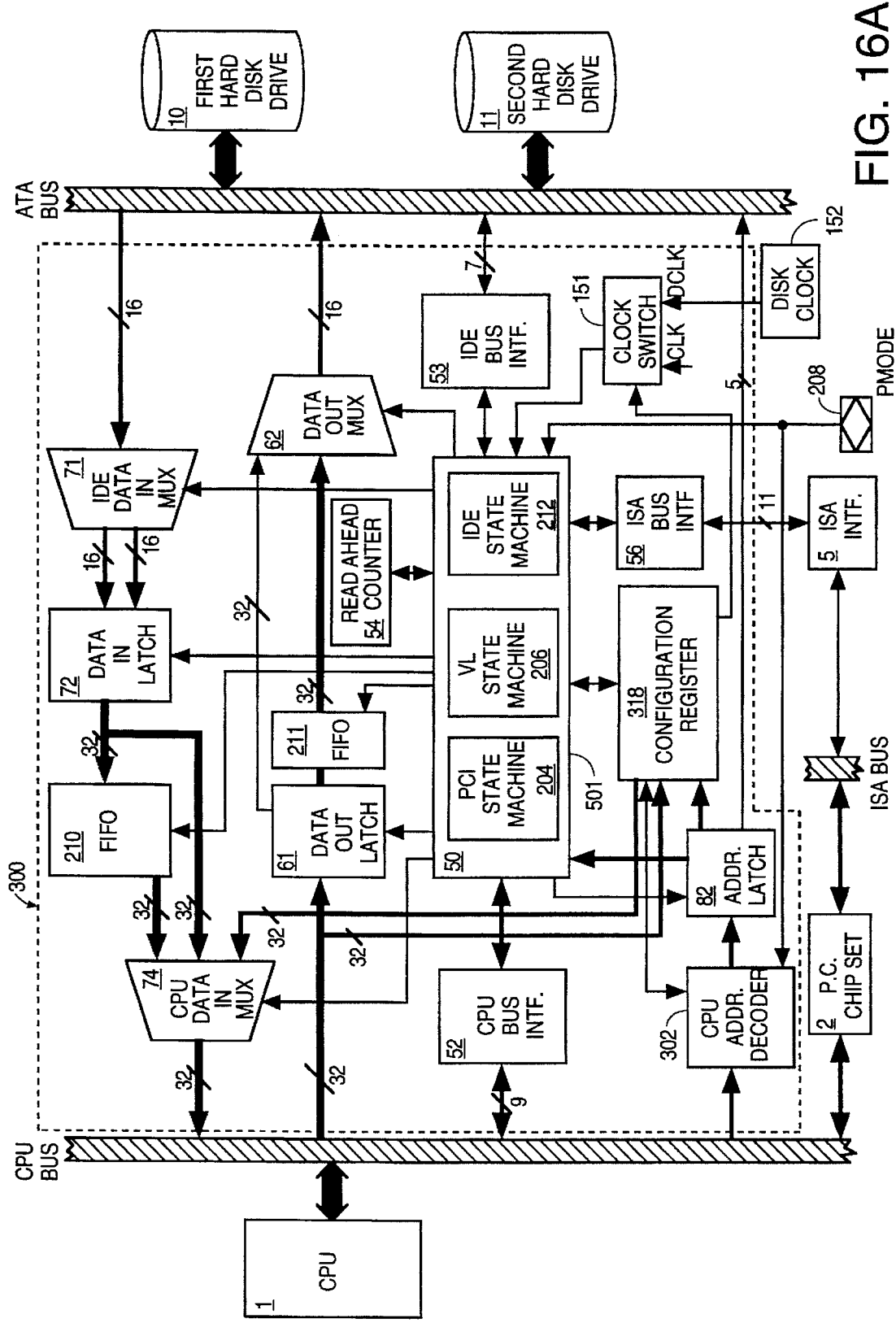
FIG. 16a is a block diagram of another embodiment of the present invention having a memory mapped IO data transfer capability in the PCI operational mode.

FIG. 16a is a block diagram of another embodiment of the present invention providing a memory mapped IO data transfer capability in the PCI mode of operation. LBPI 300 is similar to LBPI 200, but includes CPU address decoder 302 instead of CPU address decoder 202, and configuration register 318 instead of configuration register 218.

CPU address decoder 302 includes additional logic which recognizes the designated address in the memory space. Configuration register 318 stores this address in the configuration register space. This address is loaded when the system is being configured. In addition to storing the designated address in the memory space, configuration register 318 stores a bit which indicates that memory mapped transfer should be used, and may also store a range of addresses in the memory space.

When CPU address decoder 302 detects a designated memory address on the CPU bus, CPU address decoder 302 generates control signals which are sent to controlling state machine 501 (specifically, either PCI state machine 204 or VL state machine 206 depending on the logic state of PMODE pin 208) via address latch 82. In response to the control signals from address latch 82, controlling state machine 501 controls CPU bus interface 52 to perform memory data transfers on the CPU bus. For example, for a memory-mapped data write, CPU 1 and LBPI 300 use memory data transfer cycles to transfer data from the CPU bus into FIFO 211 via data out latch 61. Conversely, for a memory-mapped data read, CPU 1 and LBPI 300 use memory data transfer cycles to transfer data from FIFO 210 to the CPU bus via CPU data in multiplexer 74. The rest of the circuit operates as described above for LBPI 200 to transfer data between the LBPI 300 and the IDE bus.

Figure 16B:
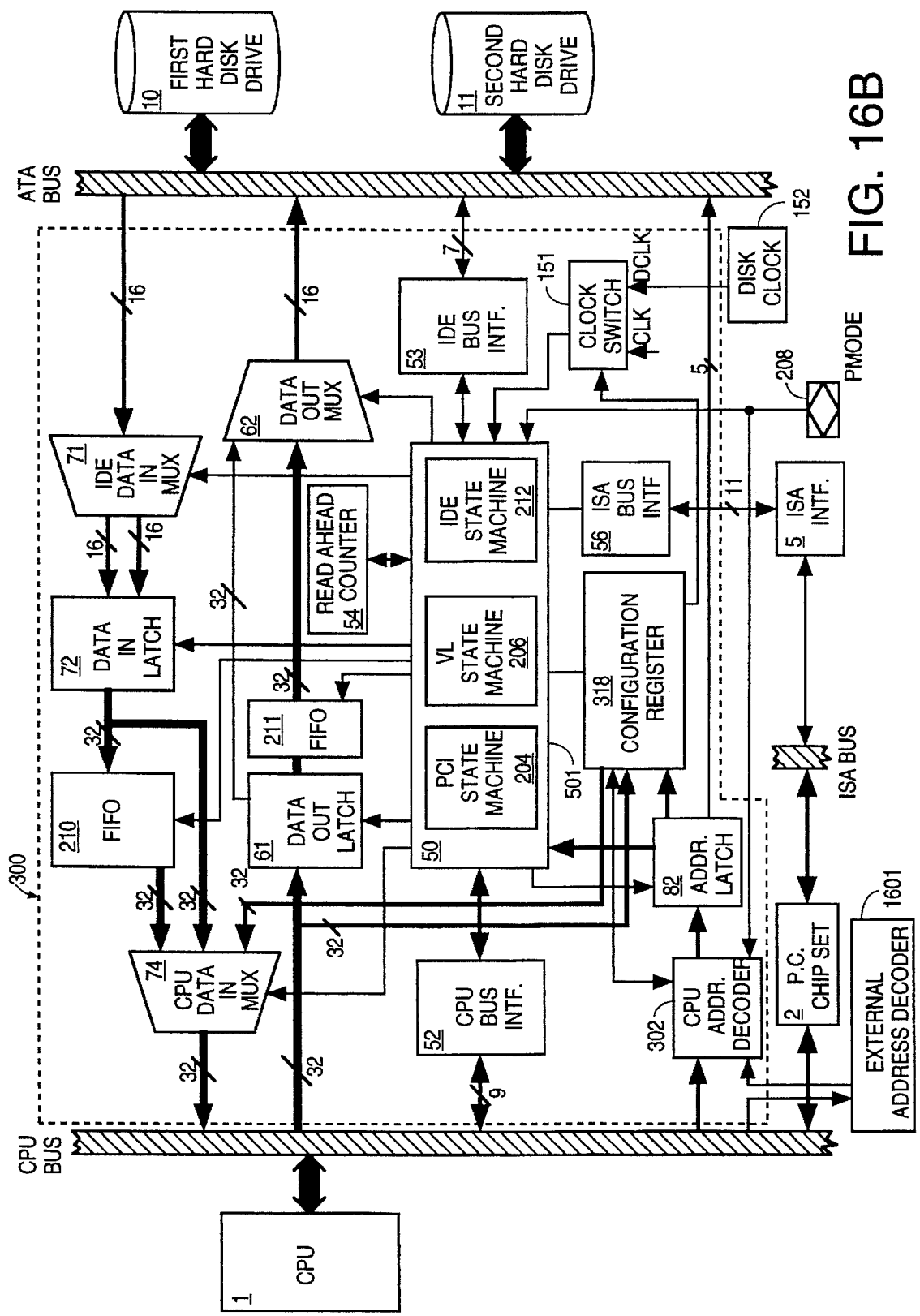
FIG. 16b is a block diagram of an embodiment of the present invention providing memory mapped IO data transfer capability in the VL operational mode.

FIG. 16b illustrates LBPI 300 connected for memory mapped transfer in the VL mode of operation. External address decoder 1601 is connected to the CPU bus and provides address information to CPU address decoder 302. This is required during VL operation since in the VL mode the address lines and data lines are separate. In other respects, the VL memory mapped data transfer operates as describes above with respect to PCI mode memory mapped data transfer.

This memory-mapped data transfer feature is used to increase host side data transfer bandwidth, which is advantageous in applications where the host side data transfers are the bandwidth bottleneck. Further, the device driver software may selectably enable this feature by appropriately loading the proper bits in configuration register 318. Because the memory addresses used in LBPI 300 for memory mapped IO data transfers cannot be used for other purposes, the user may choose to disable the memory mapped IO feature to use this memory space for other purposes. The user may also disable this feature when the ATA bus data transfers are the bandwidth bottleneck.

FIG. 17 illustrates a waveform timing diagram showing signal transitions and operating cycles of a VL bus PIO data transfer in a "486" microprocessor system. To read data from LBPI 300, first the data is placed on the VL data bus, and then this data is written into main memory (not shown). The rising edge 411 of active low address strobe (ADS#) 401 marks the beginning of a data transfer cycle. When active low CPU ready (CPURDY#) waveform 403 is high and memory (M/IO#) waveform 405 is low, a PIO transfer from LBPI 300 occurs. The end of the cycle is signaled when CPURDY# waveform 403 goes low at falling edge 413. The next cycle can begin with the rising edge 415 of CPURDY# waveform 403 after it goes low for one clock period. Because this next cycle is a memory cycle and M/IO# waveform 405 is high (signaling a memory cycle can begin), ADS# waveform 401 goes low for one period and begins the memory data transfer cycle with its rising edge 417. The falling edge 419 of CPURDY# waveform 403 signals the end of the memory data transfer cycle. Rising edge 421 occurs after CPURDY# waveform 403 stayed low for one clock period. However, the next read from LBPI 300 cannot occur until M/IO# waveform 405 goes low. The falling edge 423 of M/IO# waveform 405 does not occur until approximately 2 clock periods after rising edge 421. Thus, falling edge 423 of ADS# waveform 401, which is necessary to permit rising edge 425 to the start of the next cycle, does not occur until 2 clock periods after falling edge 421. The next LBPI read cycle occurs as described above.

FIG. 18 illustrates a waveform timing diagram showing signal transitions and operating cycles of a VL bus memory data transfer in a "486" microprocessor system. Because all of the data transfers are performed by memory transfer cycles, M/IO# waveform 505 is always high. Thus, the write cycle to write data into main memory following a read from LBPI 300 can immediately begin upon rising edge 521 of CPURDY# waveform 503. Thus, falling edge 523 of ADS# waveform 501 occurs at approximately the same time as rising edge 521. Then rising edge 525 occurs one clock period later to begin the next LBPI read cycle. As a result, VL bus memory data transfers require approximately 2 clock periods less than VL bus PIO data transfers. Thus, LBPI 300 can achieve a higher data transfer bandwidth on the VL bus when using the memory mapped feature. At relatively slower CPU clock speeds, the memory mapped IO data transfer feature can realize substantial gains in transfer bandwidth.

Figure 19A:
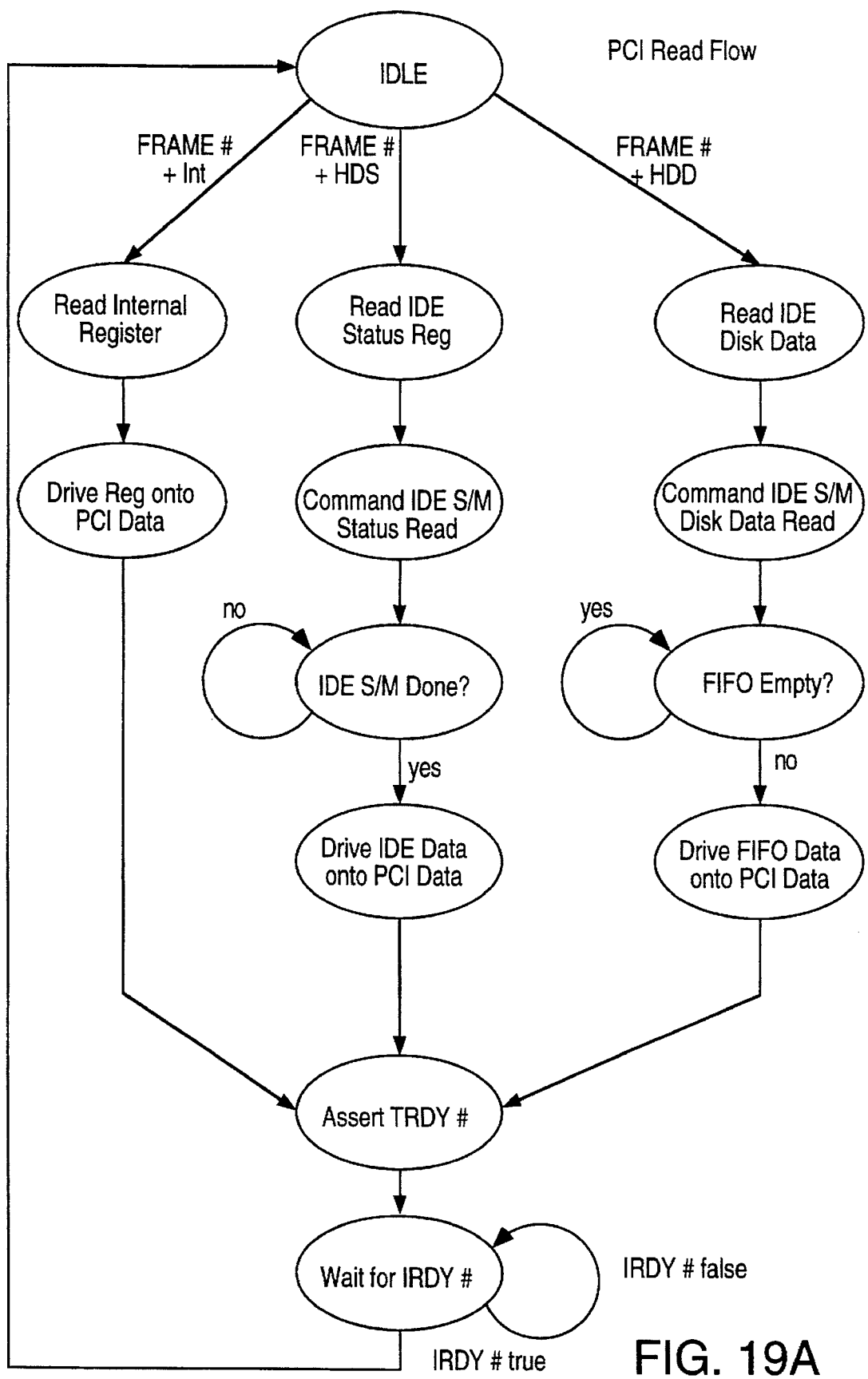
FIG. 19a shows the flow diagram for a PCI Read for PCI state machine 204 of controlling state machine 501.
Figure 19B:
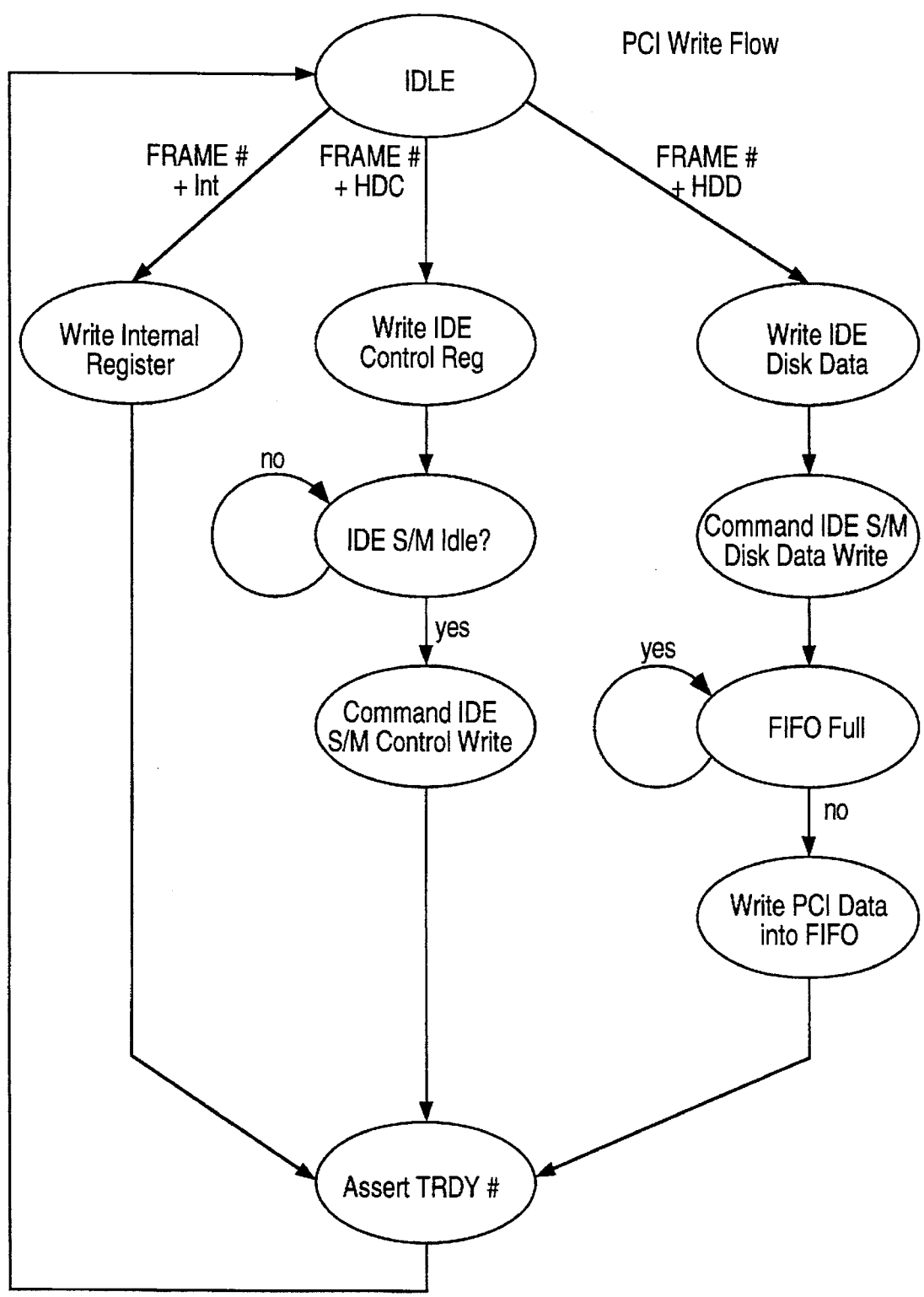
FIG. 19b shows a flow diagram for a PCI Write for PCI state machine 204 of controlling state machine 501.
Figure 20A:
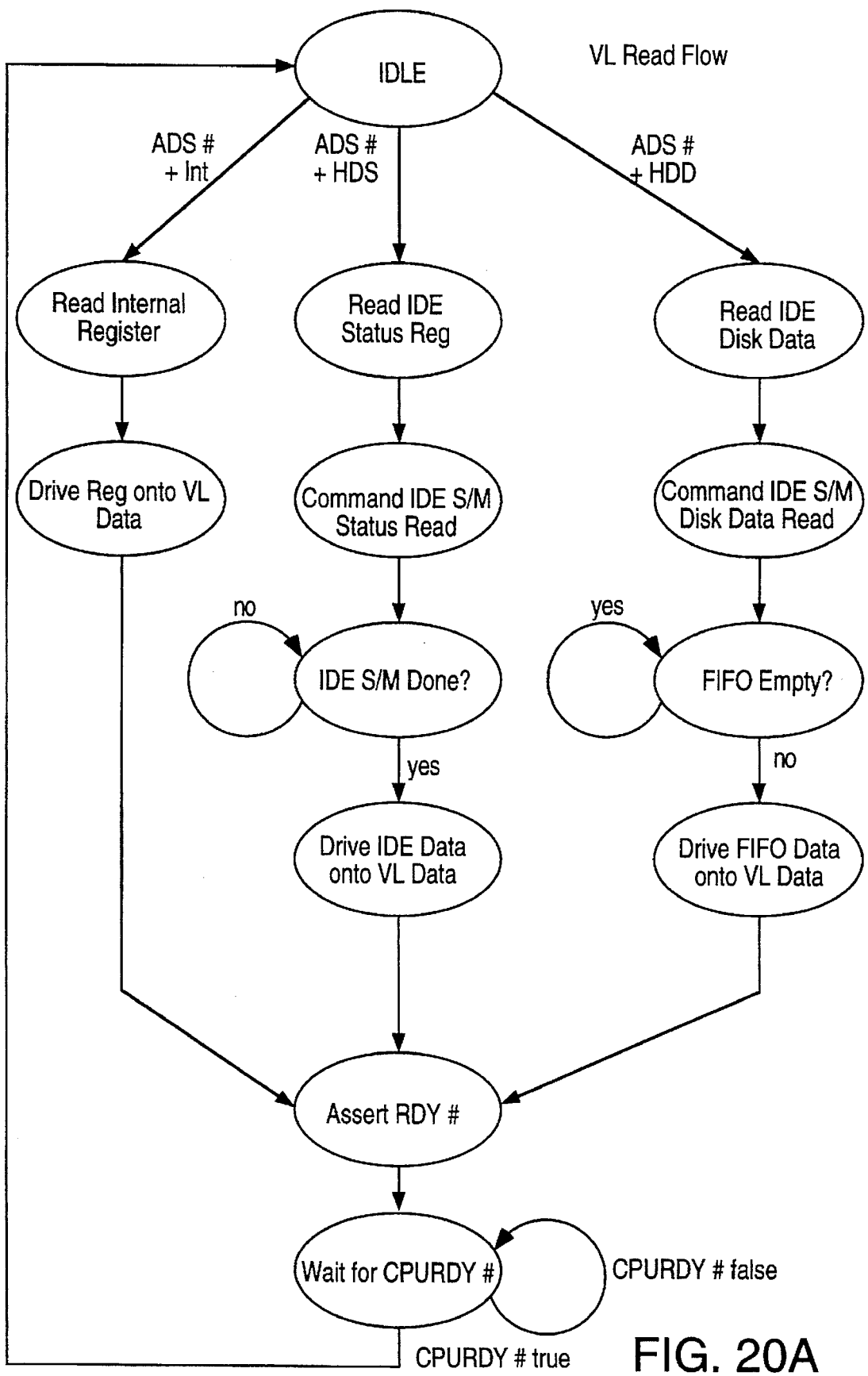
FIG. 20a shows a flow diagram for a VL Read of VL state machine 206 of controlling state machine 501.
Figure 20B:
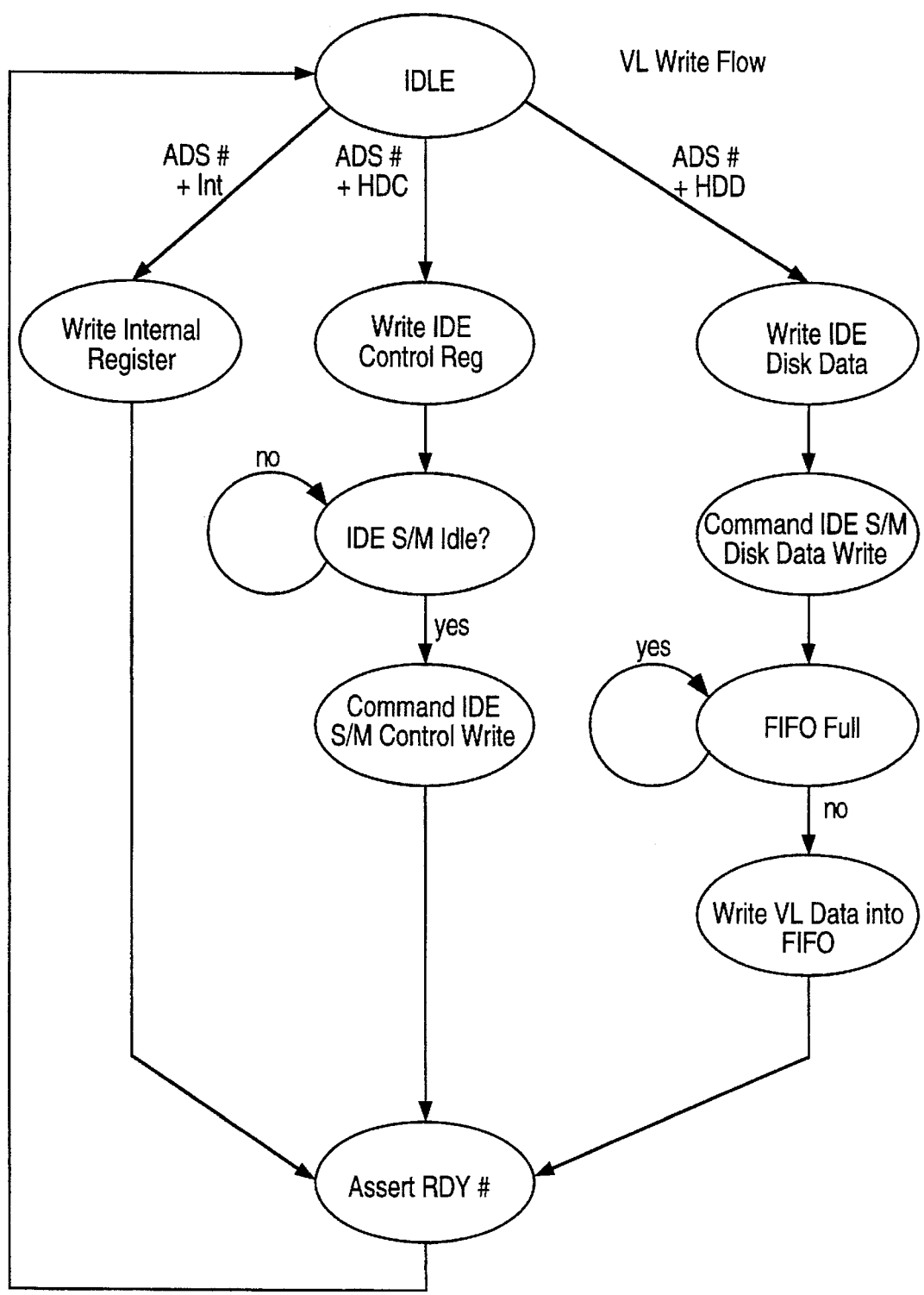
FIG. 20b shows a VL Write flow diagram for VL state machine 205 of controlling state machine 501.
Figures 2, 21A:
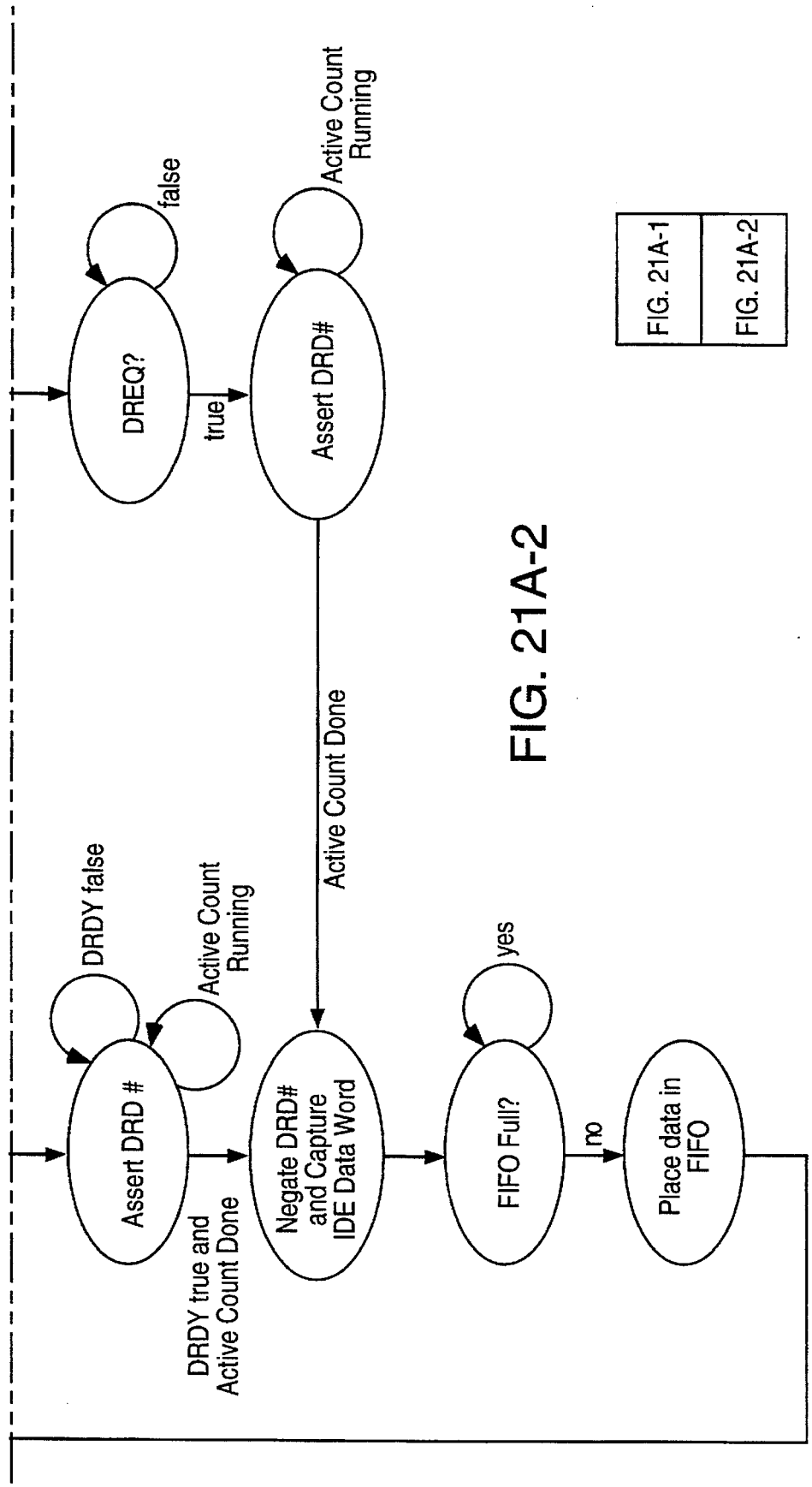
FIG. 21A, which is comprised of FIG. 21A-1 and FIG. 21A-2 arranged as illustrated in the key to FIG. 21A, shows a flow diagram for an IDE disk data read in IDE state machine 212 of controlling state machine 501.
Figures 1, 21B:
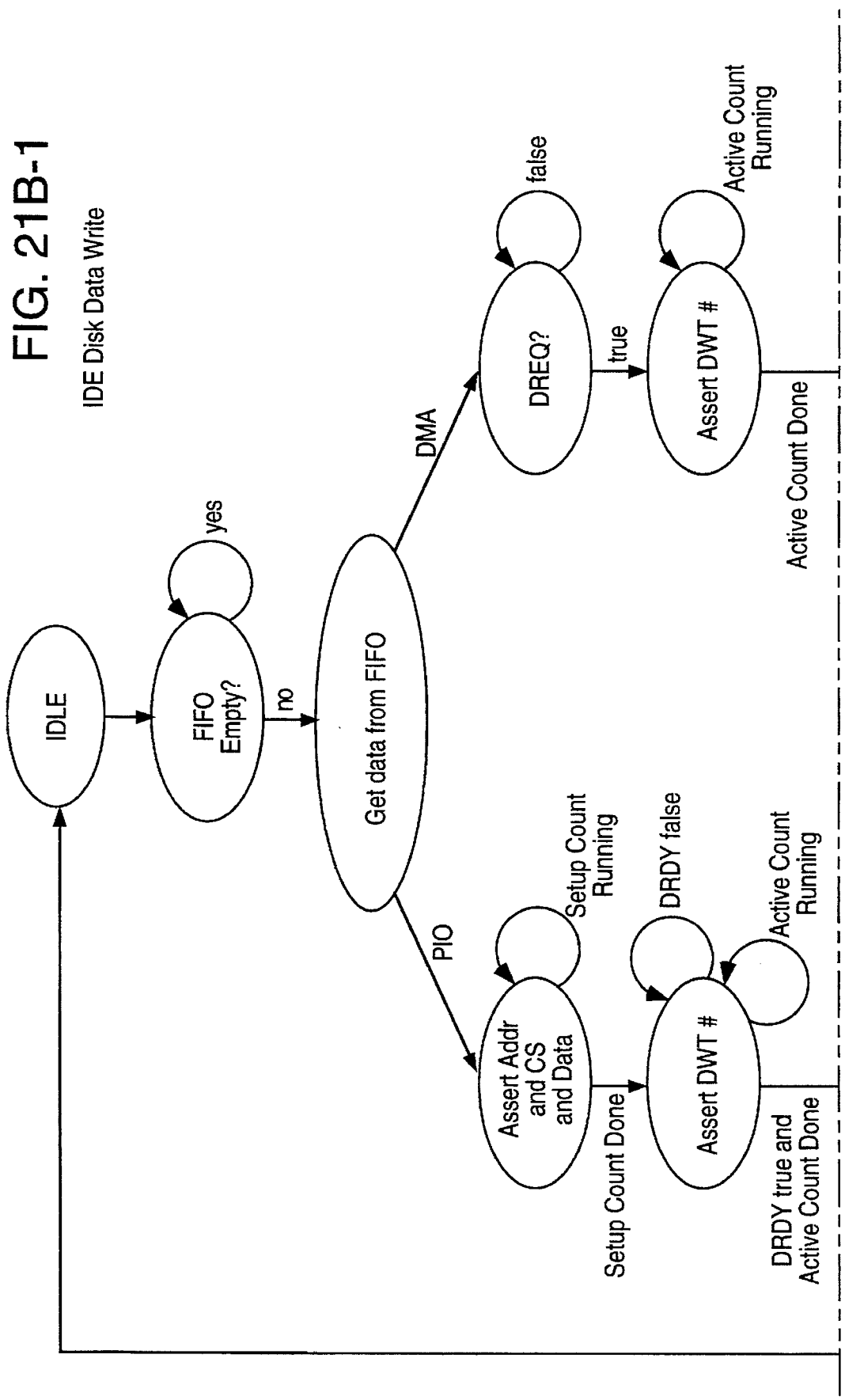
FIG. 21B, which is comprised of FIG. 21B-1 and FIG. 21B-2 arranged as illustrated in the key to FIG. 21B, shows a flow diagram of IDE state machine 212 for an IDE disk data write.
Figures 2, 21B:
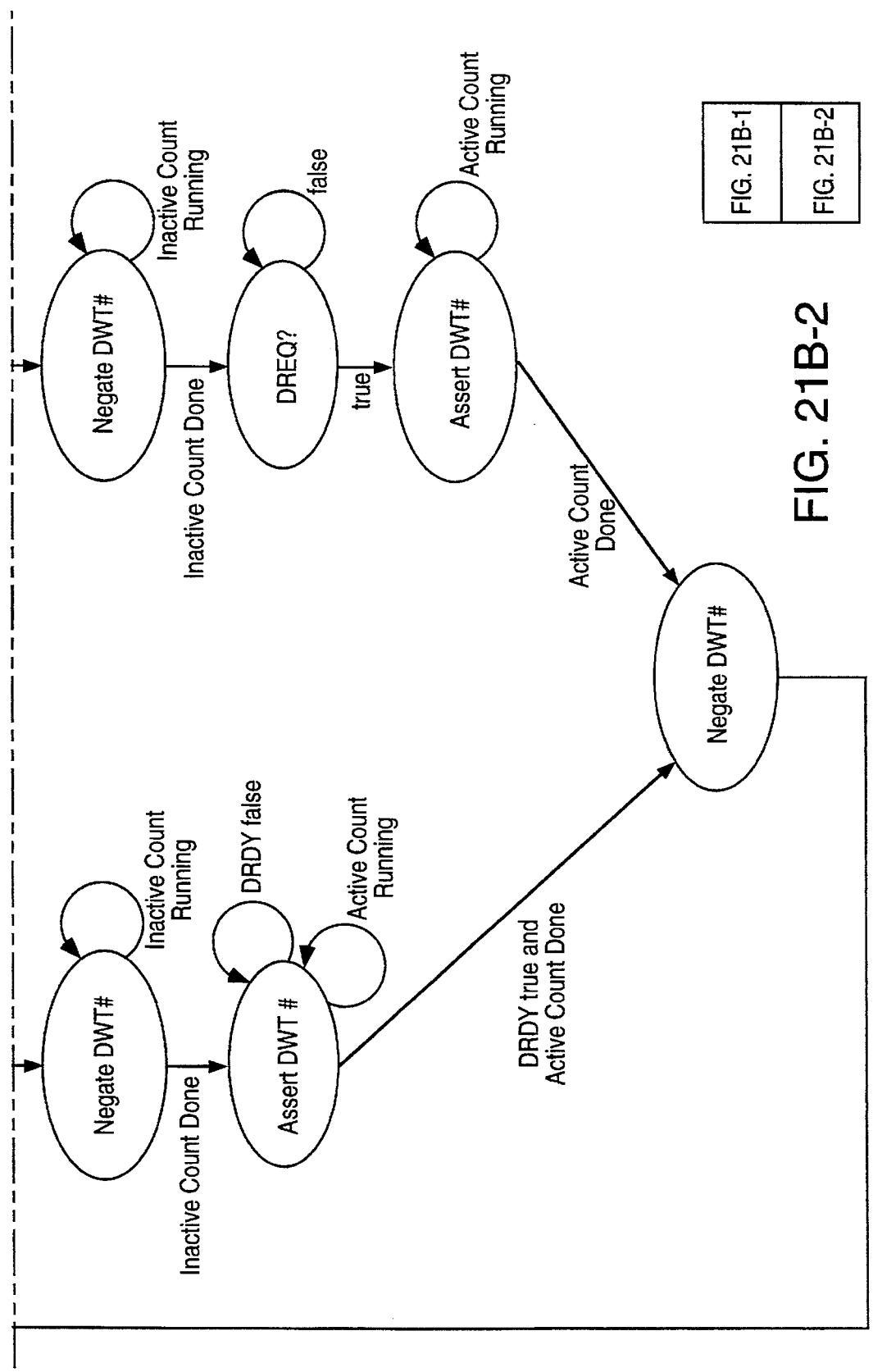
Figure 21C:
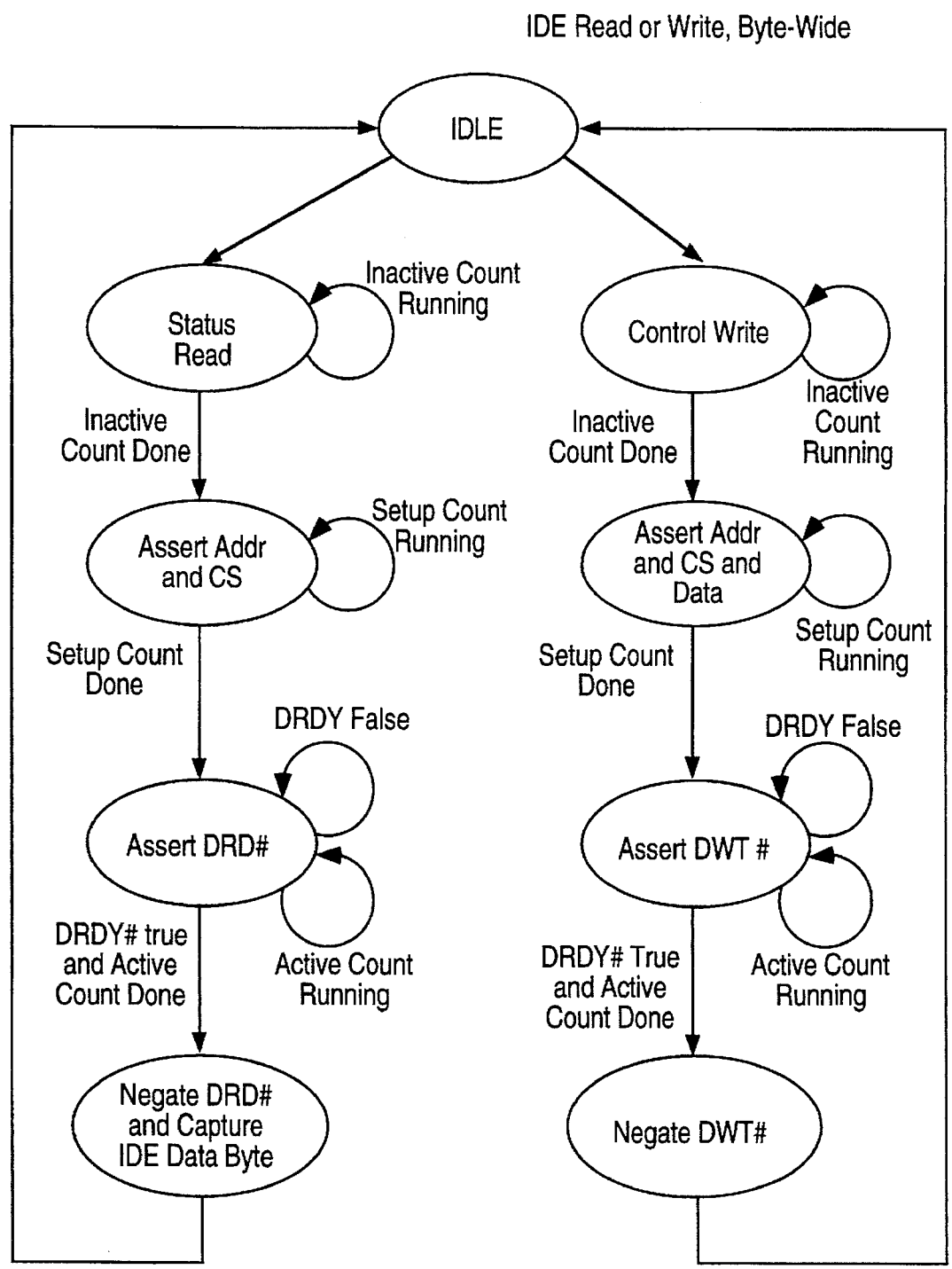
FIG. 21c shows a flow diagram for IDE state machine 212 in a IDE byte-wide read or write.

To provide further explanation of the operation of PCI state machine 204, FIGS. 19a and 19b illustrate, by flow diagram, operation of the PCI state machine 204 for read and write operations, respectively. Similarly, by reference to FIGS. 20a and 20b, the operation in the read and write modes, respectively, for VL state machine 206 is illustrated. With regard to operation of the peripheral bus side of LBPI 200 and LBPI 300, FIGS. 21a and 21b illustrate flow diagrams for IDE disk data read and IDE disk data write operations, respectively. With regard to IDE read and write in a byte-wide mode, those operations are illustrated in the flow diagram of FIG. 21c.

Additional information concerning LBPI 200 and LBPI 300 is included in APPENDIX 4, "Cirrus Logic ADI/3 Preliminary Design Manual, Local Bus IDE Interface", which is a part of this application and is incorporated herein by reference in its entirety.

DMA TRANSFER

The LBPI 200 includes features designed to make its presence transparent to the host CPU 1 when it is providing a PIO mode interface to the host system and the disk drive or peripheral with which the LBPI 200 is communicating includes DMA capability, allowing the LBPI 200 to transfer data to and from the disk drive using DMA. This enables the LBPI 200 to perform faster data transfers between peripherals with DMA capability and the host system which uses either a VL bus or a PCI bus and operates in the PIO mode. During a DMA data transfer operation the LBPI 200 will take control of the IDE bus and perform a DMA transfer with the disk drive 10 or 11 over the IDE bus, while communicating with the host CPU 1 using a PIO protocol, as necessary, for the local bus. In order to manage the data transfer between the disk drive 10 or 11 using DMA and the host CPU 1 using PIO, the LBPI 200 will utilize the FIFO 211 as described above.

When the host CPU 1 requests a data transfer either to or from one of the disk drives 10 or 11, the LBPI 200 will first determine if the data transfer operation is to be performed between the LBPI 200 and the selected disk drive 10 or 11 using either the DMA mode or the PIO mode. As explained above, the LBPI 200 will use the DMA mode if the last command detected was a DMA read or write command or if the forced DMA operation bit is set in the configuration register 218. If the disk drive 10 or 11 does include DMA capability, then the IDE state machine 212 initializes a DMA data transfer cycle on the IDE bus. When the selected disk drive 10 or 11 recognizes that a DMA data transfer cycle has been initialized, it will assert the DMA Request signal line DREQ 606 when it is ready for the data transfer to begin. In response to the assertion of the DMA Request signal line DREQ 606 by the selected disk drive 10 or 11, the IDE state machine 212 then asserts the DMA Acknowledge signal line DACK and the appropriate I/O read or write signal line. For a read operation, the selected disk drive 10 or 11 will then transfer the specified data to the LBPI 200, over the IDE bus, where it will then be transferred to the system memory over the local CPU bus. For a write operation, the LBPI 200 will transfer data previously received from the system memory, over the local CPU bus, to the selected disk drive 10 or 11 over the IDE bus. In this manner, the DMA Request Signal line DREQ 606 and the DMA Acknowledge Signal line DACK are used to transfer a block of data, one word at a time. As soon as the peripheral device has processed the first word of data, the DMA Request Signal line DREQ 606 is again asserted and the next word of data is processed by the peripheral device. These steps are repeated until the entire block of data is transferred, with the DMA Request Signal line DREQ 606 being used to signal the transfer of each word of data.

Multiple word DMA transfer operations are also used to transfer blocks of data at a time. During a multiple word DMA transfer the DMA Request Signal line DREQ 606 and the DMA Acknowledge Signal line DACK remain asserted during the transfer and the I/O read or write signal lines are used to control the timing and transfer of multiple words. The DMA data transfer operation is stopped when the disk drive de-asserts the DMA Request Signal line DREQ 606. In this manner, a DMA data transfer operation may be used to transfer an amount of data from two words up to the entire disk. The present invention supports both single word and multiple word DMA data transfer operations.

Once the LBPI 200 initializes a DMA data transfer cycle, it then waits indefinitely for the selected disk drive 10 or 11 to assert the DMA Request Signal line DREQ 606. If the selected disk drive 10 or 11 does not assert the DMA Request Signal line DREQ 606, without other circuitry to prevent this from happening, the LBPI 200 and the IDE bus will remain in a waiting state indefinitely, unable to complete another operation.

DMA TIMEOUT COUNTER

Figure 22:
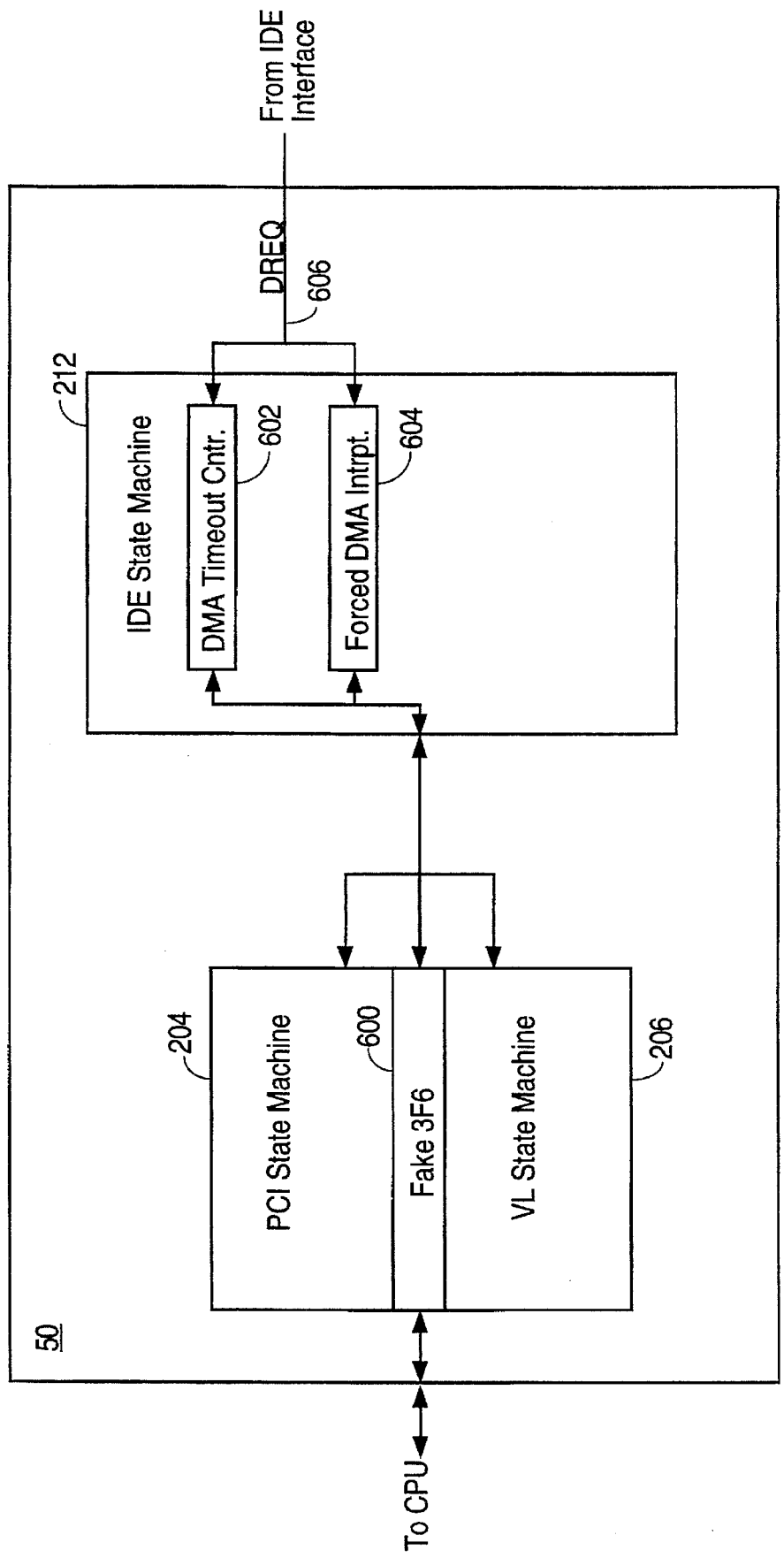
FIG. 22 illustrates a block diagram schematic of the state machine of the present invention including the DMA timeout counter, the forced DMA interrupt circuit and the Fake 3F6 register.

In order to prevent the LBPI 200 from waiting indefinitely after a DMA data transfer operation is initialized, the DMA Timeout Counter 602 is included within the IDE State Machine 212, as illustrated in FIG. 22. The DMA Timeout Counter 602 is an eight-bit counter with overflow detection and is clocked by the current IDE interface clock. The DMA Timeout Counter 602 is cleared and started when a DMA Data Transfer cycle is initialized by the IDE state machine 212 on the IDE bus. After this initialization, the DMA Timeout Counter 602 is stopped and cleared whenever the selected disk drive 10 or 11 asserts the DMA Request Signal DREQ 606, signalling that it is ready to transfer data to or from the host memory and started again when the DMA Request Signal DREQ 606 is de-asserted. When the current DMA data transfer is complete, the DMA timeout counter is not cleared and started again until the next DMA data transfer is initialized by the IDE State Machine 212.

If the selected disk drive 10 or 11 does not assert the DMA Request Signal DREQ 606 in the programmed time period, before the DMA Timeout Counter 602 overflows, the Local (VL or PCI) bus operation is terminated by the Local bus state machine (VL State machine 206 or PCI state machine 204), which is signalled by the IDE state machine 212 and the error is also reported to the imposed status register, "Fake 3F6," the operation of which will be explained below. As stated above, if the DMA Request Signal DREQ 606 is not asserted before the counter reaches its overflow value, then the IDE state machine 212 signals the Local bus state machine (VL State machine 206 or PCI state machine 204) to end the local bus cycle by a forced interrupt, signalling to the local bus that the requested data transfer operation did not take place and an error has occurred. If the requested data transfer operation which was interrupted was a write operation, the IDE state machine 212 will also instruct the selected local bus state machine 204 or 206 to place the data which was to be transferred to the selected disk drive 10 or 11 back on the local bus and terminate the operation.

Instead of the system waiting on the disk drive 10 or 11 to assert the DMA Request Signal DREQ 606 indefinitely, the DMA Timeout Counter 602 is used to notify the host CPU 1 when an error has occurred during a data transfer operation. The timeout value used by the DMA Timeout Counter 602 depends on the frequency of the clock being used by the system. A table of timeout values depending on clock frequencies is included below in Table 2.

TABLE 2

DMA Timeout Counter Periods for different Clock Frequencies

| Clock Frequency | Clock Period | Timeout Period |
| --- | --- | --- |
| 66 MHz | 15 ns | 3.84 µs |
| 50 MHz | 20 ns | 5.12 µs |
| 40 MHz | 25 ns | 6.40 µs |
| 33 MHz | 30 ns | 7.68 µs |
| 25 MHz | 40 ns | 10.24 µs |
| 20 MHz | 50 ns | 12.80 µs |
| 16 MHz | 62 ns | 16.00 µs |

FORCED DMA INTERRUPT REQUEST

During a PIO data transfer operation between the host system and a disk drive 10 or 11, the selected drive operating in the PIO mode will generate and transmit an interrupt to the host system after each data transfer command, when the drive is ready for the actual data transfer cycles to begin. When the host system receives this interrupt, it then knows that it can begin the data transfer operation and place the data to be written on the system bus or read the data to be read from the system bus. During a DMA data transfer to or from a disk drive over the IDE cable, the disk drive does not generate an interrupt signal when it is ready to complete the DMA data transfer operation. Instead, as explained above, in a DMA data transfer operation, the DMA Request Signal line DREQ and the DMA Acknowledge signal line DACK are utilized to synchronize the transfer of data between the host system and a peripheral device.

The operation of the LBPI 200 is designed to be transparent to the host system during a data transfer. Therefore, if the host system is operating using a PIO data transfer protocol and the selected disk drive 10 or 11 is operating using a DMA data transfer protocol, the IDE state machine 212, in order to fully emulate the PIO interrupt sequence for the host system during a DMA data transfer with the selected disk drive 10 or 11, may generate and transmit a forced interrupt to the host system during the data transfer operation. In order to ensure that the presence of the LBPI 200 is transparent to the host system, this forced interrupt is transmitted to the host system. It thus appears to the host that the selected drive 10 or 11 is operating using the PIO data transfer protocol and issuing the necessary interrupts to complete the data transfer operation.

The forced DMA interrupt logic circuit 604 generates the forced interrupts during a DMA data transfer operation. If the selected disk drive 10 or 11 is configured to operate using the PIO data transfer protocol, the IDE state machine 212 will not generate a forced interrupt signal, but will only pass the interrupt signal generated by the selected disk drive 10 or 11 to the host system.

Figure 23:
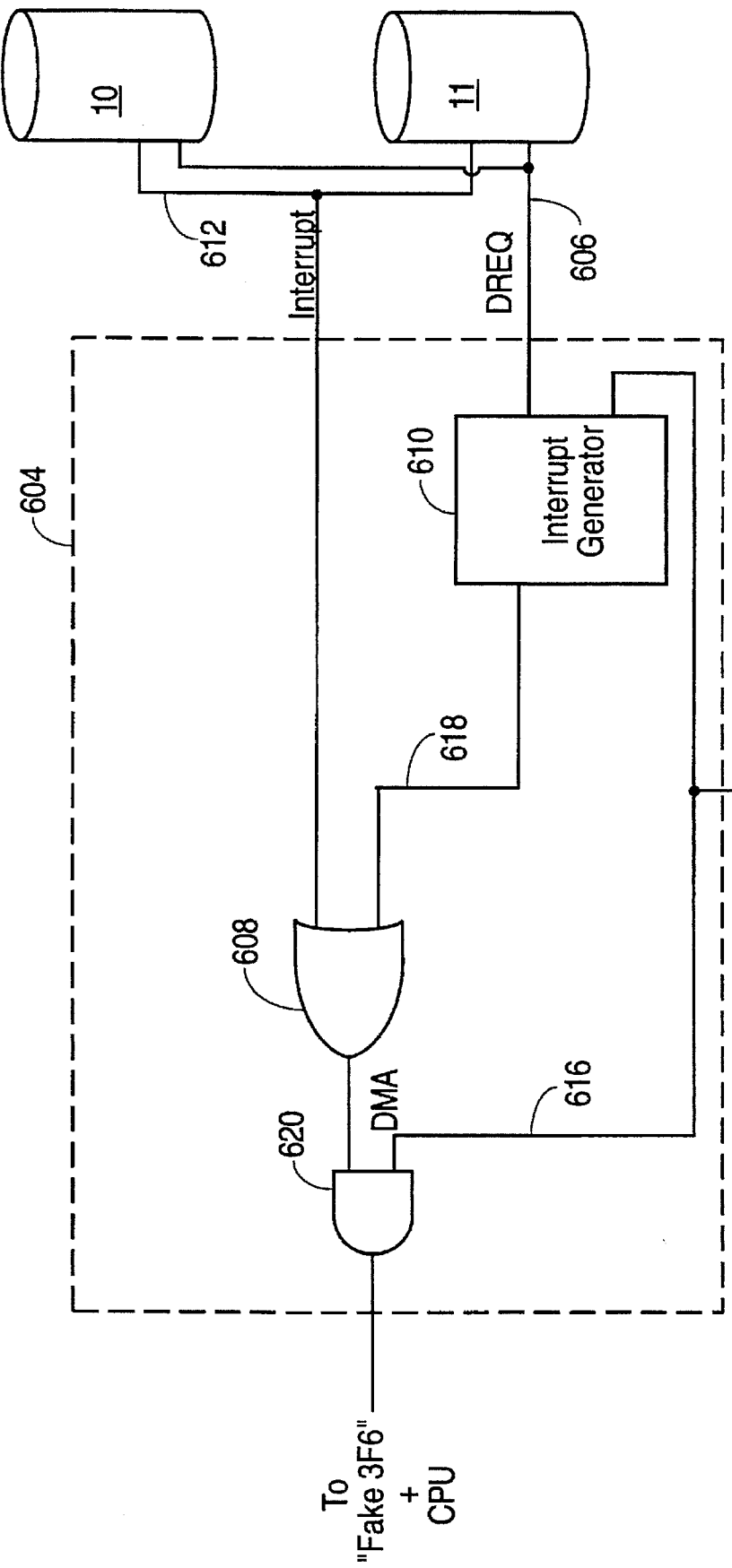
FIG. 23 illustrates a block diagram schematic of the forced DMA interrupt circuit within the IDE state machine.

There are situations when it is necessary for a disk drive 10 or 11 operating in a DMA mode to generate interrupts and transmit them to the host system. The forced DMA interrupt logic circuit 604 also allows the disk drives 10 and 11 to generate and transmit interrupts to the host system. The forced DMA interrupt logic circuit 604 includes circuitry, described below, which effectively passes these interrupt signals, generated by the disk drives 10 and 11, to the imposed status register, "Fake 3F6," and to the host system directly. When the selected disk drive 10 or 11 is configured to operate in the DMA mode, as illustrated in FIG. 23, the forced DMA interrupt circuit 604 logically ORs the interrupt signal from the selected disk drive 10 or 11 with the signal generated by the interrupt generator 610.

The interrupt signal line 612 from the IDE bus, coupled to both the disk drive 10 and the disk drive 11, is coupled as an input to the logical OR gate 608. The DMA Request Signal line DREQ 606 on the IDE bus, coupled to both the disk drive 10 and the disk drive 11, is coupled as an input to the interrupt generator logic circuit 610. The DMA mode signal line 616 from the configuration register 218 is also coupled as an input to the interrupt generator logic circuit 610. The DMA mode signal line 616 is asserted by the configuration register 218 when the selected disk drive or peripheral is configured to work in the DMA mode and a DMA data transfer operation is being performed between the LBPI 200 and the selected disk drive or peripheral. The output 618 of the interrupt generator logic circuit 610 is coupled as an input to the logical OR gate 608. The output of the logical OR gate 608 is coupled as an input to the logical AND gate 620. The DMA mode signal line 616 from the configuration register 218 is also coupled as an input to the logical AND gate 620. The output of the logical AND gate 620 is the output of the forced DMA interrupt circuit 604 and is coupled to the imposed status register, "Fake 3F6," and to the host system directly.

The Forced DMA Interrupt Logic circuit 604 transmits an interrupt signal to the host system when either of the disk drives 10 or 11 or the interrupt generator logic circuit 610 generates an interrupt signal during a DMA data transfer operation with a disk drive 10 or 11 configured to operate in the DMA mode. When the selected disk drive 10 or 11 is configured to operate in the PIO mode, the forced DMA interrupt circuit 604 does not force interrupts, but only passes the interrupt signal generated by the selected device through to the host.

The interrupt generator logic circuit 610 generates the interrupts necessary to emulate the PIO mode interrupt sequence, as if the selected disk drive 10 or 11 were operating in the PIO mode. The interrupt generator logic circuit 610 is armed and ready to generate interrupts when the DMA mode signal line 616 is asserted by the configuration register 218. An assertion of the DMA mode signal line 616 signals that a DMA mode data transfer is taking place between the LBPI 200 and the selected disk drive 10 or 11. While the interrupt generator logic circuit 610 is armed and ready to generate interrupts, an interrupt signal is generated by the interrupt generator logic circuit 610 and output on the signal line 618 when the DMA Request Signal line DREQ 606 changes from a false logic state to a true logic state. Preferably, this false-to-true logic state change is detected by a sampling circuit within the interrupt generator logic circuit 610 which samples the DMA Request Signal line DREQ 606 and detects the logic state transitions. As will be apparent to those skilled in the art, alternatively an edge-triggered circuit may be included within the interrupt generator logic circuit 610 to detect the false-to-true logic state change of the DMA Request Signal line DREQ 606. An interrupt signal transmitted to the host system is negated and the interrupt generator logic circuit 610 is disarmed by a read of the imposed status register, "Fake 3F6", by the host system on the local CPU bus. When the host system reads the status register 'h3F6, the contents of the imposed status register, "Fake 3F6", are placed on the local CPU data bus and no IDE cycle is performed. After being disarmed, the interrupt generator logic circuit 610 is not armed and ready to generate interrupts again until the DMA mode signal line 616 is asserted by the configuration register 218.

IMPOSED STATUS REGISTER

During PIO operation, the register on an IDE device at the address 'h3F6 is utilized for status reporting to the host system. In order to determine the status of the IDE device, the host will read the contents of the 'h3F6 register during PIO operation. During a DMA data transfer operation between the LBPI 200 and the selected disk drive 10 or 11, when the host system is operating in the PIO mode, the LBPI 200 will not allow the host system to read the contents of the 'h3F6 register of the selected disk drive 10 or 11. Instead, the selected local bus state machine 204 or 206 uses the imposed status or Fake 3F6 register 600, which allows the LBPI 200 to conduct a DMA data transfer with the selected disk drive 10 or 11 while maintaining a PIO mode interface with the host system.

The LBPI 200, during normal operation, enforces a one-to-one relationship between local bus cycles and IDE bus cycles, for accesses to the IDE bus command and status addresses. However, in the case of an access to the 'h3F6 register, the selected local bus state machine 204 or 206 intercepts local bus reads to the 'h3F6 register and returns the imposed status or Fake 3F6 status byte stored in the Fake 3F6 register 600, without utilizing the IDE bus. The contents of the Fake 3F6 register 600 are only transmitted to the host system during DMA mode data transfer operations when the selected disk drive 10 or 11 is configured to operate in the DMA mode. Otherwise, if the selected disk drive 10 or 11 is configured to operate in the PIO mode, the Fake 3F6 register 600 is not utilized, and a read operation of the selected disk drive's actual status register 'h3F6 is performed when requested by the host system. In the case of PIO mode data transfer operations, the LBPI 200 only passes the status information read from the appropriate disk drive's status register 'h3F6 through to the host system.

The imposed status or Fake 3F6 register 600 is an eight-bit register. The most significant bit, bit 7, of the Fake 3F6 register 600 signals the status of the forced DMA interrupt generated by the forced DMA interrupt logic circuit 604, as explained above. When bit 7 of the Fake 3F6 register 600 is at a logical high voltage level it signals that the forced DMA interrupt logic circuit 604 has generated an interrupt request. When bit 7 of the Fake 3F6 register 600 is at a logical low voltage level it signals that the forced DMA interrupt logic circuit 604 has not generated an interrupt request. The bit 7 of the Fake 3F6 register 600 is programmed by the forced DMA interrupt logic circuit 604.

The bit 6 of the Fake 3F6 register 600 signals the current status of the interrupt signal DINT on the IDE bus. The bit 6 of the Fake 3F6 register 600 is programmed directly from the interrupt signal DINT on the IDE bus.

The bit 5 of the Fake 3F6 register 600 signals whether or not a DMA timeout interrupt has been generated by the DMA Timeout counter 602. The bit 5 of the Fake 3F6 register 600 is programmed by the DMA Timeout Counter 602. When the bit 5 of the Fake 3F6 register 600 is at a logical high voltage level it signals that a DMA timeout has occurred and the DMA Request Signal DREQ was not asserted before the DMA timeout counter overflowed. When the bit 5 of the Fake 3F6 register 600 is at a logical low voltage level it signals that a DMA timeout has not yet occurred.

The bit 3 of the Fake 3F6 register 600 signals the current status of the DMA Request signal line DREQ on the IDE bus. The bit 3 of the Fake 3F6 register 600 is programmed directly from the DMA Request Signal line DREQ on the IDE bus. This bit is programmed to match the status of the DMA Request Signal line DREQ bit in the true status of 'h3F6 register in the disk drives 10 or 11. This allows the system to read the imposed status or Fake 3F6 register and correctly determine if the selected disk drive 10 or 11 is ready to transfer data.

The bit 1 of the Fake 3F6 register 600 signals whether or not the internal hard disk data FIFO of the LBPI 200 is full. The bit 1 of the Fake 3F6 register 600 is programmed by the selected local bus state machine 204 or 206 using information from the internal hard disk data FIFO. When the bit 1 of the Fake 3F6 register 600 is at a logical high voltage level it signals that the internal hard disk data FIFO of the LBPI 200 is full. When the bit 1 of the Fake 3F6 register 600 is at a logical low voltage level it signals that the internal hard disk data FIFO of the LBPI 200 is not full.

The least significant bit, bit 0, of the Fake 3F6 register 600 signals whether or not the internal hard disk data FIFO of the LBPI 200 is empty. The bit 0 of the Fake 3F6 register 600 is programmed by the selected local bus state machine 204 or 206 using information from the internal hard disk data FIFO. When the bit 0 of the Fake 3F6 register 600 is at a logical high voltage level it signals that the internal hard disk data FIFO of the LBPI 200 is empty. When the bit 0 of the Fake 3F6 register 600 is at a logical low voltage level, it signals that the internal hard disk data FIFO of the LBPI 200 is not empty.

The bits 4 and 2 of the Fake 3F6 register 600 are reserved and are not utilized in the preferred embodiment of the present invention. Alternatively, the bits 4 and 2 of the Fake 3F6 register 600 may be used to signal other status information to the host system.

While a plurality of embodiments of the invention have been described, this description is not intended to be limiting and other embodiments will be obvious to those skilled in the art based on this disclosure. Thus, while this invention has been described using an 80×86 type microprocessor architecture and the IDE/ATA Bus and/or VGA Bus, the principles of this invention apply equally to the use of a local bus peripheral interface between a computer and any peripheral device(s) including, but not limited to, magnetic or optical storage systems and display devices in a computer with a non-80×86 type system architecture. Further, although the embodiment of FIG. 16 includes the features of the embodiment of FIG. 15, it is understood that the memory mapped IO data transfer feature described in conjunction with the embodiment of FIG. 16 can be combined with any of the other embodiments described without departing from the spirit and scope of the invention.

We claim:

1. A method of transferring information from a CPU to a disk drive, comprising the steps of:

transferring information from the CPU to an interface circuit over a computer bus using a PIO protocol, the CPU being incapable of transferring information to the interface circuit over the computer bus using DMA; and transferring the information from the interface circuit to the disk drive over a peripheral bus using DMA, wherein the DMA is initiated at least in part by the interface circuit receiving a DMA request signal on the peripheral bus, the DMA request signal not being used to arbitrate for the peripheral bus, the interface circuit outputting a DMA acknowledge signal onto the peripheral bus which causes the information to be transferred into a predetermined location in the disk drive.

2. The method of claim 1, wherein the predetermined location is an ATA drive data register of the disk drive.

3. The method of claim 1, further comprising the steps of:

storing in the interface circuit characteristics of the disk drive; and providing control signals to the interface circuit based on the stored characteristics to transfer information between the interface circuit and the disk drive, wherein the stored characteristics from the storing step control the timing of the control signals.

4. The method of claim 1, wherein the CPU can selectably control the interface circuit and the disk drive to transfer information between the interface circuit and the disk drive by DMA or by another type of transfer.

5. The method of claim 1, wherein a peripheral device other than the disk drive is coupled to the peripheral bus, the method further comprising the steps of:

transferring second information from the computer bus to the interface circuit using a PIO protocol; and transferring the second information from the interface circuit to the peripheral device using a PIO protocol.

6. A method of transferring information from a host device to a peripheral device, comprising the steps of:

transferring information from the host device to an interface circuit over a computer bus using a PIO protocol, the host device being incapable of transferring information to the interface circuit over the computer bus using DMA; and transferring the information from the interface circuit to the peripheral device over a peripheral bus using DMA, wherein the DMA is initiated at least in part by the interface circuit receiving a DMA request signal on the computer bus, the DMA request signal not being used to arbitrate for the peripheral bus, the interface circuit outputting a DMA acknowledge signal onto the peripheral bus which causes the information to be transferred into a predetermined location in the peripheral device.

7. A method of transferring information from a disk drive to a CPU via an interface circuit, comprising the steps of:

transferring information from the disk drive to the interface circuit over a peripheral bus using DMA, wherein the DMA is initiated at least in part by the interface circuit receiving a DMA request signal on the peripheral bus, the DMA request signal not being used to arbitrate for the peripheral bus, the interface circuit outputting a DMA acknowledge signal onto the peripheral bus which causes the information to be transferred out of the disk drive; and transferring the information from the interface circuit to the CPU over a computer bus using a PIO protocol, the CPU being incapable of receiving information from the interface circuit over the computer bus using DMA.

* * * * *